US012086332B2

(12) United States Patent
Yoo et al.

(10) Patent No.: US 12,086,332 B2
(45) Date of Patent: Sep. 10, 2024

(54) POSITION INPUT DEVICE AND POSITION INPUT SYSTEM INCLUDING THE SAME

(71) Applicant: SAMSUNG DISPLAY CO., LTD., Yongin-si (KR)

(72) Inventors: Gi Na Yoo, Cheonan-si (KR); Ju Yeon Kim, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/091,534

(22) Filed: Dec. 30, 2022

(65) Prior Publication Data
US 2023/0288997 A1 Sep. 14, 2023

(30) Foreign Application Priority Data

Mar. 10, 2022 (KR) .................. 10-2022-0029779

(51) Int. Cl.
G06F 3/0354 (2013.01)
G06F 3/042 (2006.01)
(52) U.S. Cl.
CPC .......... G06F 3/03545 (2013.01); G06F 3/042 (2013.01)
(58) Field of Classification Search
CPC .... G06F 3/03545; G06F 3/042; G06F 3/0321; G06F 3/03542; G06F 3/0418; G06F 3/04186; G06F 3/0346; G06F 3/0425; G06F 2203/0383; G06F 3/0421; G09G 3/32; G09G 3/3208; G09G 2370/22
See application file for complete search history.

(56) References Cited

U.S. PATENT DOCUMENTS

| 2014/0028744 A1* | 1/2014 | Hashi | G09G 3/3406 345/697 |
| 2014/0267186 A1* | 9/2014 | Kreek | G06F 1/3259 345/179 |
| 2016/0077784 A1 | 3/2016 | Yamada | |

FOREIGN PATENT DOCUMENTS

| CN | 204596230 | 8/2015 |
| KR | 10-2014-0046327 | 4/2014 |
| KR | 10-2014-0067487 | 6/2014 |
| KR | 10-2014-0079215 | 6/2014 |

* cited by examiner

Primary Examiner — Patrick N Edouard
Assistant Examiner — Joseph P Fox
(74) Attorney, Agent, or Firm — F. CHAU & ASSOCIATES, LLC

(57) ABSTRACT

A position input device includes: a communication circuit receiving slope angle information of a display panel; a code detector detecting a pattern shape image of position code patterns of the display panel by emitting infrared light to the display panel and receiving infrared light reflected from the display panel; a light emitting driver controlling an infrared light emitting operation of the code detector; a slope detector detecting slope angle information of the position input device; and a code processor modulating infrared light emitting characteristics of the code detector or modulating pattern shape image data in response to an arrangement angle information between the display panel and the position input device.

18 Claims, 23 Drawing Sheets (a)

| angle range | image data gray scale range (dynamic range) |
|---|---|
| 80° ~ 90° | 80 gray — 175 gray |
| 70° ~ 80° | 70 gray — 185 gray |
| 60° ~ 70° | 60 gray — 195 gray |
| 50° ~ 60° | 50 gray — 205 gray |
| 40° ~ 50° | 40 gray — 215 gray |
| 30° ~ 40° | 30 gray — 225 gray |
| 20° ~ 30° | 20 gray — 235 gray |
| 10° ~ 20° | 10 gray — 245 gray |
| 0° ~ 10° | 0 gray — 255 gray |

(a)

(b)

(c)

(d)

(a)

(b)

(c)

(d)

POSITION INPUT DEVICE AND POSITION INPUT SYSTEM INCLUDING THE SAME

CROSS-REFERENCE TO RELATED APPLICATION

This application claims priority under 35 U.S.C. § 119 to Korean Patent Application No. 10-2022-0029779 filed on Mar. 10, 2022 in the Korean Intellectual Property Office, the disclosure of which is incorporated by reference herein in its entirety.

TECHNICAL FIELD

The present invention relates to a position input device and a position input system including the same.

DISCUSSION OF THE RELATED ART

With the advancement of the information age, the demand for a display device, which displays images, in various forms and configurations has increased. For example, the display device has been incorporated into various electronic devices such as a smart phone, a digital camera, a laptop computer, a navigator and a smart television. The display device may be a flat panel display device such as a liquid crystal display device, a field emission display device and an organic light emitting display device. Among the flat panel display devices, the light emitting display device includes a light emitting element in which each of pixels of a display panel may self-emit light, thereby displaying an image without a backlight unit to provide the display panel with light. The display device including the flat panel display may be foldable or bendable.

A recent display device supports a touch input using a portion (e.g., finger) of a user's body and a touch input using an electronic pen. The display device may sense an input from the electronic pen more precisely than when using only a touch input from a portion of the user's body by sensing a pointer of the electronic pen or a position of the use of the electronic pen.

SUMMARY

According to an embodiment of the present invention, a position input device includes: a communication circuit receiving slope angle information of a display panel; a code detector detecting a pattern shape image of position code patterns of the display panel by emitting infrared light to the display panel and receiving infrared light reflected from the display panel; a light emitting driver controlling an infrared light emitting operation of the code detector; a slope detector detecting slope angle information of the position input device; and a code processor modulating infrared light emitting characteristics of the code detector or modulating pattern shape image data in response to an arrangement angle information between the display panel and the position input device.

In an embodiment of the present invention, the code processor computes the slope angle information of the display panel and the slope angle information of the position input device in a preset computation manner to convert or detect the arrangement angle information between the display panel and the position input device, and generates a light emission control signal such that at least one of infrared luminous intensity or wavelength band characteristics of the code detector are changed in response to the arrangement angle information between the display panel and the position input device.

In an embodiment of the present invention, the code processor modulates an amplitude and a pulse width of the light emission control signal so that at least one of infrared luminous intensity or wavelength band of the code detector is changed in proportion to or inversely proportional to a change in the arrangement angle information between the display panel and the position input device, and supplies the modulated light emission control signal to the light emitting driver.

In an embodiment of the present invention, the code processor sequentially reads infrared luminous intensity setting values corresponding to a change in the arrangement angle information between the display panel and the position input device, modulates an amplitude and a pulse width of the light emission control signal to change at least one of the infrared luminous intensity or wavelength band characteristics of the code detector in accordance with the read infrared luminous intensity setting values, and supplies the modulated amplitude and pulse width to the light emitting driver.

In an embodiment of the present invention, the position input device further includes a data corrector modulating the pattern shape image data detected from the code detector in response to a change in the arrangement angle information between the display panel and the position input device and supplying the modulated pattern shape image data to the code processor.

In an embodiment of the present invention, the code processor computes the slope angle information of the display panel and the slope angle information of the position input device in a preset computation manner to convert or detect the arrangement angle information between the display panel and the position input device, and transmits the arrangement angle information between the display panel and the position input device to the data corrector in real time.

In an embodiment of the present invention, the code processor detects a pattern shape image for the position code patterns from the modulated pattern shape image data modulated and input from the data corrector, and extracts and combines data codes corresponding to an arrangement structure and shape of the position code patterns to extract position coordinate data corresponding to the data codes.

In an embodiment of the present invention, the data corrector compares the arrangement angle information between the display panel and the position input device with a plurality of preset angle range information, variably sets a dynamic range of maximum and minimum gray scale values of the pattern shape image to correspond to a range including the arrangement angle information between the display panel and the position input device, modulates the gray scale values of the pattern shape image data so that the gray scale values of the pattern shape image are included within the dynamic range of the maximum and minimum gray scale values, which are variably set, and transmits the modulated gray scale values to the code processor.

In an embodiment of the present invention, the data corrector sets the dynamic range of the maximum and minimum gray scale values of the pattern shape image to be narrower as the arrangement angle information between the display panel and the position input device is vertical or close to vertical, and sets the dynamic range of the maximum and minimum gray scale values of the pattern shape image to be wider as the arrangement angle information between the display panel and the position input device becomes smaller.

In an embodiment of the present invention, the data corrector variably sets a contrast difference or ratio of the pattern shape image to correspond to the change in the arrangement angle information between the display panel and the position input device, and modulates the gray scale values of the pattern shape image in accordance with the variably set contrast difference or ratio of the pattern shape image to transmit the modulated gray scale values to the code processor.

In an embodiment of the present invention, the data corrector decreasingly sets a contrast ratio to lower a difference or ratio between the maximum gray scale value and the minimum gray scale value of the pattern shape image as the arrangement angle information between the display panel and the position input device is vertical or close to vertical, and increasingly sets the contrast ratio to increase the difference or ratio between the maximum gray scale value and the minimum gray scale value of the pattern shape image as the arrangement angle information between the display panel and the position input device becomes smaller.

In an embodiment of the present invention, the code processor detects a pattern shape image for the position code patterns from the pattern shape image in which the contrast ratio is modulated for each arrangement angle information between the display panel and the position input device, and extracts and combines data codes corresponding to the arrangement structure and shape of the position code patterns to extract position coordinate data corresponding to the data codes.

According to an embodiment of the present invention, a position input system includes: a display device displaying an image; and a position input device inputting position coordinate data to the display device by detecting position code patterns of the display device, wherein the position input device includes: a communication circuit receiving slope angle information of a display panel in the display device; a code detector detecting a pattern shape image of the position code patterns by emitting infrared light to the display panel and receiving infrared light reflected from the display panel; a light emitting driver controlling an infrared light emitting operation of the code detector; a slope detector detecting slope angle information of the position input device; and a code processor modulating infrared light emitting characteristics of the code detector or modulating pattern shape image data in response to an arrangement angle information between the display panel and the position input device.

In an embodiment of the present invention, the position input system further includes a data corrector modulating the pattern shape image data detected from the code detector in response to a change in the arrangement angle information between the display panel and the position input device and supplying the modulated pattern shape image data to the code processor.

In an embodiment of the present invention, the code processor computes the slope angle information of the display panel and the slope angle information of the position input device in a preset computation manner to convert or detect the arrangement angle information between the display panel and the position input device, and transmits the arrangement angle information between the display panel and the position input device to the data corrector in real time.

In an embodiment of the present invention, the code processor detects a pattern shape image for the position code patterns from the modulated pattern shape image data modulated and input from the data corrector, and extracts and combines data codes corresponding to an arrangement structure and shape of the position code patterns to extract position coordinate data corresponding to the data codes.

In an embodiment of the present invention, the data corrector compares the arrangement angle information between the display panel and the position input device with a plurality of preset angle range information, variably sets a dynamic range of maximum and minimum gray scale values of the pattern shape image to correspond to a range including the arrangement angle information between the display panel and the position input device, modulates the gray scale values of the pattern shape image data so that the gray scale values of the pattern shape image are included within the dynamic range of the maximum and minimum gray scale values, which are variably set, and transmits the modulated gray scale values to the code processor.

In an embodiment of the present invention, the data corrector sets the dynamic range of the maximum and minimum gray scale values of the pattern shape image to be narrower as the arrangement angle information between the display panel and the position input device is vertical or close to vertical, and sets the dynamic range of the maximum and minimum gray scale values of the pattern shape image to be wider as the arrangement angle information between the display panel and the position input device becomes smaller.

In an embodiment of the present invention, the data corrector variably sets a contrast difference or ratio of the pattern shape image to correspond to the change in the arrangement angle information between the display panel and the position input device, and modulates the gray scale values of the pattern shape image in accordance with the variably set contrast difference or ratio of the pattern shape image to transmit the modulated gray scale values to the code processor.

In an embodiment of the present invention, the data corrector decreasingly sets a contrast ratio to lower a difference or ratio between the maximum gray scale value and the minimum gray scale value of the pattern shape image as the arrangement angle information between the display panel and the position input device is vertical or close to vertical, and increasingly sets the contrast ratio to increase the difference or ratio between the maximum gray scale value and the minimum gray scale value of the pattern shape image as the arrangement angle information between the display panel and the position input device becomes smaller.

BRIEF DESCRIPTION OF THE DRAWINGS

The above and other features of the present invention will become more apparent by describing in detail embodiments thereof with reference to the attached drawings, in which:

FIG. 16 is a view illustrating a method of modulating maximum and minimum gray scales of pattern shape images based on a change in a slope angle between a display panel and a position input device;

DETAILED DESCRIPTION OF THE DISCLOSURE

Figure 1:
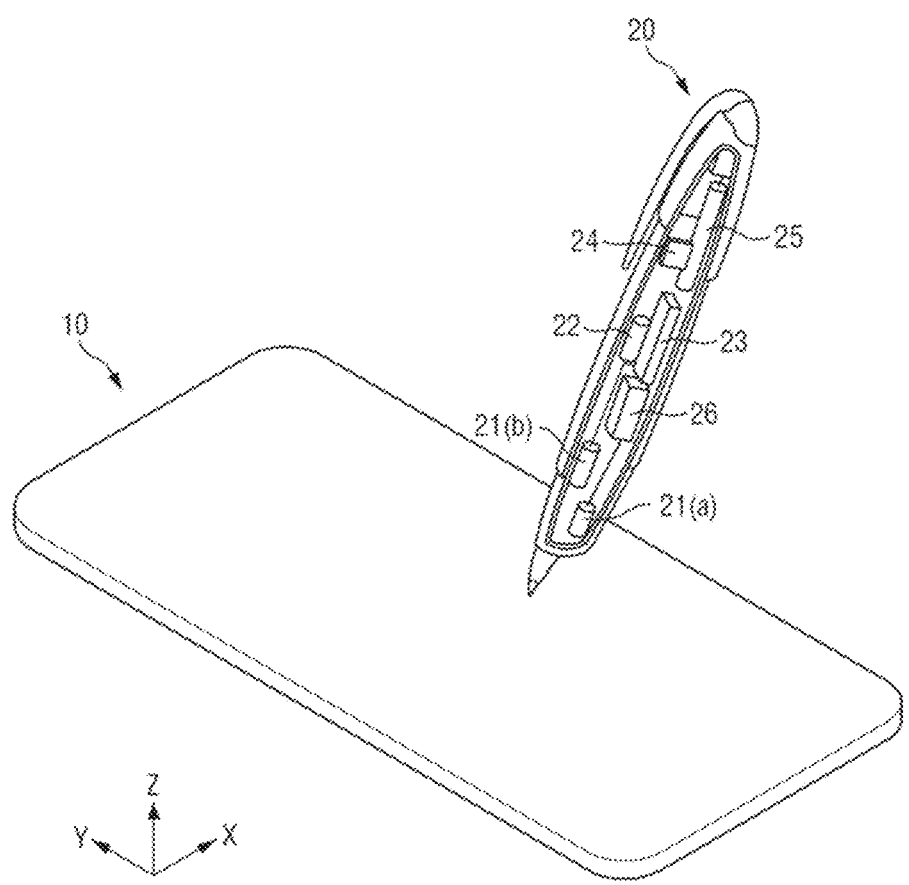
FIG. 1 is a schematic view illustrating a position input system according to an embodiment of the present invention.

The present invention will now be described more fully hereinafter with reference to the accompanying drawings, in which preferred embodiments of the invention are shown. This invention may, however, be embodied in different forms and should not be construed as being limited to the embodiments set forth herein.

It will also be understood that when a layer is referred to as being "on" another layer or substrate, it can be directly on the other layer or substrate, or intervening layers may also be present. The same reference numbers may indicate the same components throughout the specification, and thus, repetitive descriptions may be omitted.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could also be termed the first element.

Each of the features of the various embodiments of the present invention may be combined with each other, in part or in whole, and technically various interlocking and driving are possible. Each embodiment of the present invention may be implemented independently of each other or may be implemented together in an association.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present invention. Further, the blocks, units and/or modules of the embodiments may be physically combined into more complex blocks, units and/or modules without departing from the scope of the present invention.

Hereinafter, embodiments of the present invention will be described with reference to the accompanying drawings.

Figure 2:
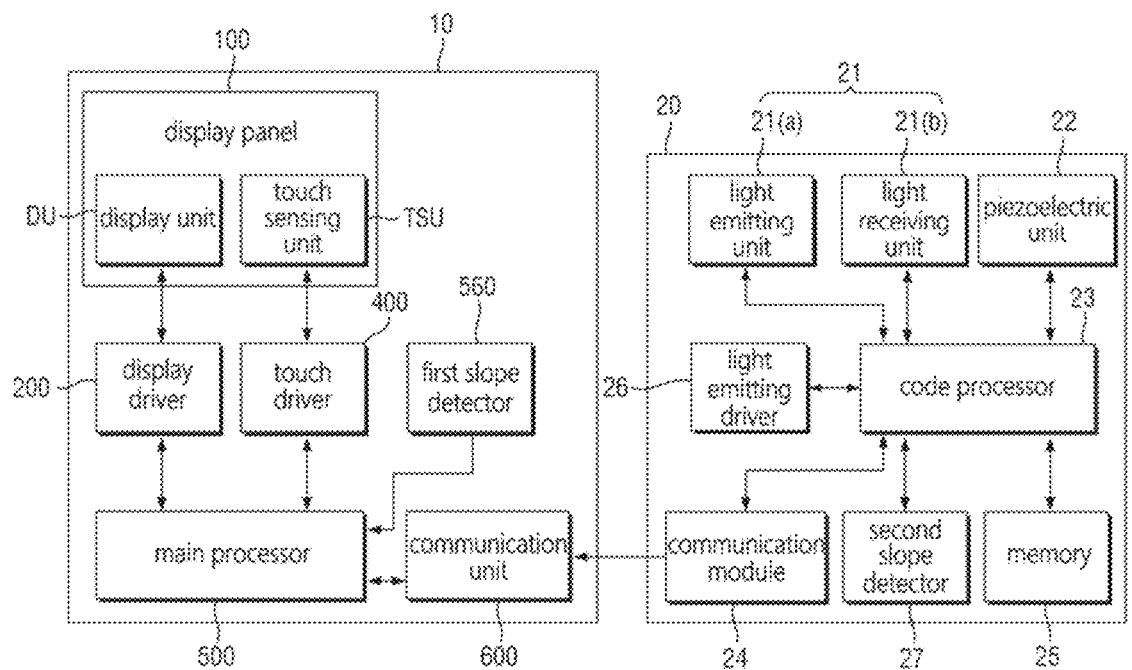
FIG. 2 is a schematic block view illustrating a display device and a position input device, which are shown in FIG. 1.

FIG. 1 is a schematic view illustrating a position input system according to an embodiment of the present invention. FIG. 2 is a schematic block view illustrating a display device and a position input device, which are shown in FIG. 1.

Referring to FIGS. 1 and 2, the display device 10 may be applied to, for example, a portable electronic device such as a mobile phone, a smart phone, a tablet personal computer (PC), a mobile communication terminal, an electronic diary, an electronic book, a portable multimedia player (PMP), a navigator, and an ultra mobile PC (UMPC). Unlike this, the display device 10 may be applied to a television, a laptop computer, a monitor, a signboard, or a display unit of Internet of things (IoT). For another example, the display device 10 may be applied to a wearable device such as a smart watch, a watch phone, an eyeglasses-type display and a head mounted display (HMD).

The display device 10 may be a light emitting display device such as an organic light emitting display device using an organic light emitting diode, a quantum dot light emitting display device including a quantum dot light emitting layer, an inorganic light emitting display device including an inorganic semiconductor, and a micro or nano light emitting display device using a micro or nano light emitting diode. In the following description, the display device 10 will be described as being an organic light emitting display device, but the present invention is not limited thereto.

The display device 10 includes a display panel 100, a display driver 200, a touch driver 400, a main processor 500, a first slope detector 560, and a communication unit 600.

The display device 10 uses a position input device 20, such as an electronic pen, as a position coordinate input means. The display panel 100 of the display device 10 may include a display unit DU and a touch sensing unit TSU. The display unit DU may be for displaying an image, and the touch sensing unit TSU may be for sensing a touch of a human body such as a finger and a touch pen.

The display unit DU of the display panel 100 may include a plurality of unit pixels, and may display an image through the plurality of unit pixels. The touch sensing unit TSU may be integrally formed or packaged on the display panel 100. For example, the touch sensing unit TSU may be disposed on a front surface of the display panel 100. The touch sensing unit TSU may include a plurality of touch electrodes, and may sense a touch of a user's body and a touch pen in a capacitance manner on the front surface of the display panel 100. In this case, position code patterns are formed on the touch electrodes of some of the plurality of touch electrodes, so that the position code patterns are sensed by the position input device 20.

The position code patterns of the display panel 100 are made of a light shielding member that forms a predetermined planar code shape by covering some of the plurality of touch electrodes in a predetermined area. Thus, the position code patterns are sensed by the position input device 20 in accordance with a planar code pattern shape and size (or area) of the light shielding member. The position code patterns formed of the light shielding member absorb or shield external light incident on the front surface of the display panel 100.

The display driver 200 may output signals and voltages for driving the display unit DU of the display panel 100. The display driver 200 may supply data voltages to data lines of the display panel 100. The display driver 200 may supply a power voltage to a power line and supply gate control signals to a gate driver.

The touch driver 400 may be connected to the touch sensing unit TSU. The touch driver 400 may supply a touch driving signal to the plurality of touch electrodes of the touch sensing unit TSU, and may sense a change in capacitance between the plurality of touch electrodes. The touch driver 400 may calculate a touch input and touch coordinates of a user based on the change amount of capacitance between the plurality of touch electrodes.

The first slope detector 560 may be embedded in the display panel 100 to detect slope angle information of the display panel 100. The first slope detector 560 may include an analog-to-digital (AD) conversion circuit and at least one sensor of, for example, an acceleration sensor, a gyro sensor, a slope sensor, or a gravity sensor. The first slope detector 560 may detect slope angle information of the display panel 100 in real time or detect the slope angle information of the display panel 100 in response to a detection control signal of the main processor 500. The first slope detector 560 supplies the detected slope angle information of the display panel 100 to the main processor 500 and the communication unit 600.

The main processor 500 may control all functions of the display device 10. For example, the main processor 500 may supply digital video data to the display driver 200 so that the display panel 100 displays an image. In addition, the main processor 500 may receive touch data from the touch driver 400 to determine the touch coordinates of the user touch input, and then may generate digital video data based on the touch coordinates or execute applications indicated by icons displayed on the touch coordinates of the user touch input.

In addition, the main processor 500 receives position coordinate data from the position input device 20 to determine position coordinates of a pointer or arrangement direction of the position input device 20. The main processor 500 may generate digital video data based on the pointer or arrangement position coordinate of the position input device 20, or may execute applications indicated by icons displayed on the position coordinates of the position of the position input device 20.

The communication unit 600 may perform wired/wireless communication with an external device. For example, the communication unit 600 may transmit and receive a communication signal to and from a communication module 24 of the position input device 20. The communication unit 600 may receive position coordinate data comprised of data codes from the position input device 20, and may provide the position coordinate data to the main processor 500. Further, the communication unit 600 transmits the slope angle information of the display panel 100, which is detected through the first slope detector 560, to the position input device 20.

The position input device 20 may be positioned on the display panel 100. For example, the position input device 20 may be positioned on a front surface of the display panel 100 and moved along the front surface in accordance with a user's use. The position input device 20 may be an electronic pen, such as a smart pen of a writing instrument shape, but the present invention is not limited to a writing instrument type or structure.

The position input device 20 recognizes the position code patterns of the display panel 100 in the front surface of the display panel 100, thereby detecting position coordinates of a pointer or arrangement in the front surface of the display panel 100. For example, the position input device 20 senses light reflected from the position code patterns of the display panel 100 by using an optical method. The position code patterns may be detected based on the sensed light, and position coordinate data according to the position code patterns may be generated.

For example, the position input device 20 includes a code detector 21, a piezoelectric sensor 22, a code processor 23, a communication module (e.g., circuit) 24, a memory 25, a light emitting driver 26, and a second slope detector 27.

The code detector 21 is disposed to be adjacent to a pen tip portion of the position input device 20 to detect the position code patterns included in the display panel 100 of the display device 10. To this end, the code detector 21 includes a light emitting unit 21(a) and a light receiving unit 21(b). The light emitting unit 21 may be for emitting infrared light by using at least one infrared light source, and the light receiving unit 21(b) may be for detecting infrared light reflected from the position code patterns through an infrared camera.

The at least one infrared light source included in the light emitting unit 21(a) may be comprised of an infrared LED array of a matrix structure. The light emitting unit 21(a) emits infrared light having an intensity corresponding to a size of a light emitting driving signal input from the light emitting driver 26.

The infrared camera of the light receiving unit 21(b) may include a filter, a lens system, and an optical image sensor. The filter may block a wavelength band other than the infrared light and allow the infrared light to pass therethrough. The lens system may focus the infrared light passing through the filter, and the optical image sensor may convert an optical image formed by the lens system into an electrical image signal and output the image signal. The optical image sensor may be comprised of an array of a matrix structure in the same manner as the infrared LED array to provide shape data of the position code patterns to the code processor 23 in accordance with a form of infrared light reflected from the position code patterns of the display unit DU. In this way, the code detector 21 of the position input device 20 may continuously detect the position code patterns included in display unit DU in accordance with the control and movement of the user, and may continuously generate the shape data of the position code patterns to provide the shape data to the code processor 23.

The second slope detector 27 may be embedded in the display panel 100 to detect the slope angle information of the position input device 20. The second slope detector 27 may include an AD conversion circuit and at least one sensor of, for example, an acceleration sensor, a gyro sensor, a slope sensor, or a gravity sensor. The second slope detector 27 may detect the slope angle information of the position input device 20 in real time or in response to the detection control signal of the code processor 23. The second slope detector 27 supplies the detected slope angle information of the position input device 20 to the code processor 23.

The code processor 23 may continuously receive the pattern shape image data of the position code patterns from the code detector 21. For example, the code processor 23 may continuously receive the pattern shape image data from the code detector 21, and may identify the arrangement structure and shape of the position code patterns. The code processor 23 may extract or generate data codes corresponding to the arrangement structure and shape of the position code patterns, and may combine the data codes to extract or generate position coordinate data corresponding to the combined data codes. The code processor 23 may transmit the generated position coordinate data to the display device 10 through the communication module 24. For example, the code processor 23 may generate coordinate data without complex computation and correction by receiving the shape data of the position code patterns to generate and convert the data codes corresponding to the position code patterns.

In addition, the code processor 23 detects arrangement angle (or, e.g., conversion angle) information of the position input device 20 disposed on the front surface of the display panel 100 as compared with the display panel 100, by using the slope angle information of the display panel 100, which is received through the communication module 24, and the slope angle information of the position input device 20. In addition, the code processor 23 generates a light emission control signal for adjusting at least one of an infrared light emission amount or light emission intensity of the light emitting unit 21(a) in response to the arrangement angle information of the position input device 20 as compared with the display panel 100. For example, the code processor 23 may generate and modulate the light emission control signal so that infrared light emitting characteristics of the light emitting unit 21(a) may be changed in response to the change in the arrangement angle information of the position input device 20 as compared with the display panel 100. The modulated light emission control signal may be supplied to the light emitting driver 26 to change the infrared light emitting characteristics of the light emitting unit 21(a). At this time, the code processor 23 may modulate an amplitude and a pulse width of the light emission control signal so that at least one of infrared luminous intensity or wavelength band characteristics of the light emitting unit 21(a) may be changed in accordance with the change in the arrangement angle information of the position input device 20 as compared with the display panel 100.

For example, the code processor 23 may modulate the light emission control signal such that at least one of the infrared luminous intensity or the wavelength band of the light emitting unit 21(a) may be changed in proportion to or inverse proportion to the change in the arrangement angle information of the position input device 20 as compared with the display panel 100. The modulated light emission control signal is supplied to the light emitting driver 26. In this case, the light emission control signal, of which amplitude and pulse width are modulated, is a signal for controlling driving of the light emitting unit 21(a) of the code processor 23.

The light emitting driver 26 supplies a light emitting driving signal having a size corresponding to the light emission control signal to the light emitting unit 21(a) in response to the light emission control signal input from the code processor 23. Therefore, the light emitting unit 21(a) may emit infrared light so that the infrared luminous intensity, light emitting period and the light emitting wavelength band may be changed in response to an input period and a size of the light emitting driving signal input from the light emitting driver 26. The driving characteristic control of the light emitting unit 21(a) of the code processor 23, that is, the modulation method of the light emission control signal, will be described in more detail with reference to the accompanying drawings and graphs.

The communication module 24 may perform wired/wireless communication with an external device. For example, the communication module 24 may transmit and receive a communication signal to and from the communication unit 600 of the display device 10. The communication module 24 may receive position coordinate data comprised of data codes from the code processor 23 and provide the position coordinate data to the communication unit 600. Further, the communication module 24 supplies the slope angle information of the display panel 100, which is received from the communication unit 600 of the display panel 100, to the code processor 23.

The memory 25 may store data for driving the position input device 20. The shape data of the position code patterns and data codes corresponding to the shape data and the position code patterns are stored in the memory 25. In addition, the data codes and position coordinate data according to combination of the data codes are stored in the memory 25. The memory 25 shares the data codes, which correspond to the respective shape data and the position code patterns, and the position coordinate data according to the combination of the data codes with the code processor 23. Therefore, the code processor 23 may combine the data codes stored in the memory 25 through the position coordinate data, and may extract or generate position coordinate data corresponding to the combined data codes.

Figure 3:
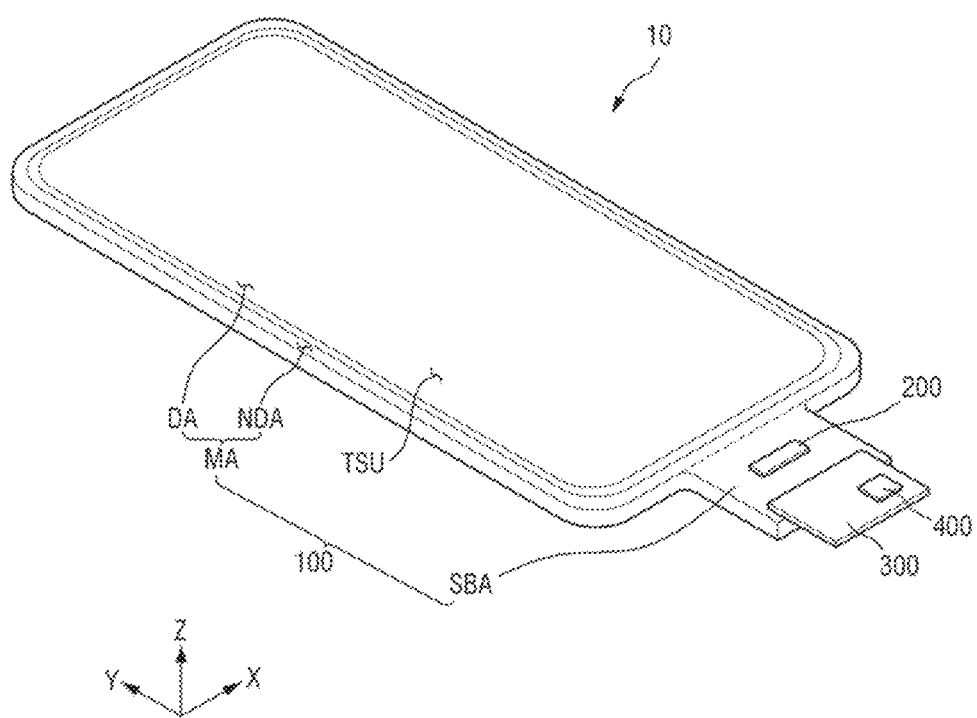
FIG. 3 is a perspective view illustrating a configuration of the display device shown in FIG. 1.
Figure 4:
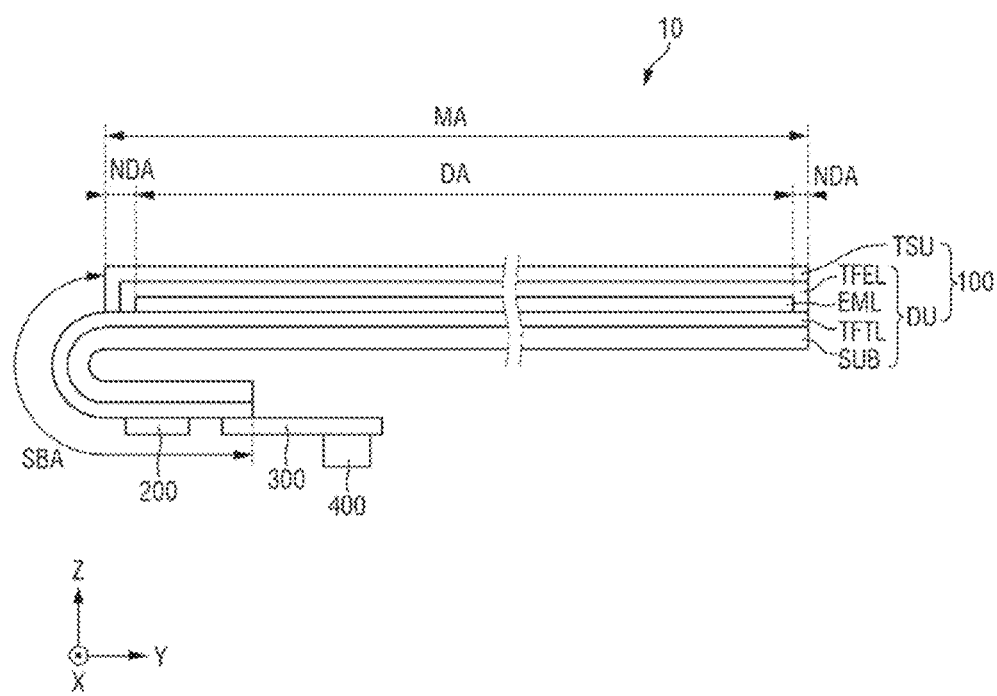
FIG. 4 is a cross-sectional view illustrating a configuration of the display device shown in FIGS. 1 and 3.

FIG. 3 is a perspective view illustrating a configuration of the display device shown in FIG. 1. FIG. 4 is a cross-sectional view illustrating a configuration of the display device shown in FIGS. 1 and 3.

Referring to FIGS. 3 and 4, the display device 10 may be formed in a planar shape similar to a rectangular shape. For example, the display device 10 may have a planar shape similar to a rectangular shape having a short side in X-axis direction and a long side in Y-axis direction. For example, a corner where the short side, which is in the X-axis direction, and the long side, which is in the Y-axis direction, meet may be rounded to have a predetermined curvature or formed at right angles. The planar shape of the display device 10 is not limited to the rectangular shape, and may be formed similarly to other polygonal shapes, a circular shape or an oval shape. The display panel 100 may be formed to be flat, but the present invention is not limited thereto. For example, the display panel 100 includes a curved portion formed at left and right ends, having a constant curvature or a variable curvature. The display panel 100 may be flexibly formed to be bent, folded, and rolled.

The display panel 100 may include a main area MA and a sub-area SBA. The main area MA includes a display area DA and a non-display area NDA. The display area DA may be an area in which an image is displayed, and the non-display area NDA may be a peripheral area of the display area DA. The display area DA may emit light from a plurality of unit pixels and a plurality of open areas (or, e.g., light emission areas) corresponding to the unit pixels. The display panel 100 may include, for example, a pixel circuit, a pixel defining layer, and a self-light emitting element. The pixel circuit may include switching elements. The pixel defining layer may define a light emission area or an opening area, and the self-light emitting element may emit light through the light emission area or the opening area. The non-display area NDA may be outside of the display area DA. The non-display area NDA may be an edge area of the main area MA of the display panel 100. The non-display area NDA may include a gate driver for supplying gate signals to gate lines, and fan-out lines for connecting the display driver 200 with the display area DA.

In the display area DA of the display panel 100, a plurality of unit pixels are arranged in the first and second directions (e.g., X-axis and Y-axis directions), and each unit pixel includes a plurality of subpixels. The plurality of unit pixels display an image by using the plurality of subpixels. The plurality of subpixels may be arranged in a Pentile™ matrix structure. In addition, the plurality of subpixels may be arranged in a vertical or horizontal stripe structure. The display area DA in which the plurality of unit pixels are arranged may occupy at least a portion of the main area MA.

The non-display area NDA may be adjacent to the display area DA. The non-display area NDA may at least partially surround the display area DA. The non-display area NDA may be an edge area of the main area MA of the display panel 100. The non-display area NDA may include a gate driver for supplying gate signals to gate lines, and fan-out lines for connecting the display driver 200 with the display area DA.

The sub-area SBA may be extended from one side of the main area MA. The sub-area SBA may include a flexible material capable of being subjected to bending, folding, rolling and the like. For example, when the sub-area SBA is bent, the sub-area SBA may overlap the main area MA in a thickness direction (Z-axis direction). The sub-area SBA may include a display driver 200 and a pad area connected to a circuit board 300. In addition, the sub-area SBA may be omitted, and the display driver 200 and the pad area may be disposed in the non-display area NDA.

The display driver 200 may be formed of an integrated circuit (IC), and may be packaged on the display panel 100 by a chip on glass (COG) method, a chip on plastic (COP) method or an ultrasonic bonding method. For example, the display driver 200 may be disposed in the sub-area SBA, and may overlap the main area MA in the thickness direction (Z-axis direction) by bending of the sub-area SBA. For another example, the display driver 200 may be packaged on the circuit board 300.

The circuit board 300 may be attached onto the pad area of the display panel 100 using an anisotropic conductive film (ACF). Lead lines of the circuit board 300 may be electrically connected to the pad area of the display panel 100. The circuit board 300 may be a flexible printed circuit board, a printed circuit board, or a flexible film such as a chip on film.

The touch driver 400 may be packaged on the circuit board 300. The touch driver 400 may be formed of an integrated circuit (IC). As described above, the touch driver 400 may supply a touch driving signal to the plurality of touch electrodes of the touch sensing unit TSU, and may sense a change in an amount in capacitance between the plurality of touch electrodes. For example, the touch driving signal may be a pulse signal having a predetermined frequency. The touch driver 400 calculates a touch input of a user's body such as finger and touch coordinates based on the change in capacitance between the plurality of touch electrodes.

Referring to FIG. 4, the display panel 100 may include a display unit DU, a touch sensing unit TSU, and a polarizing film on a section of the display panel 100. The display unit DU may include a substrate SUB, a thin film transistor layer TFTL, a light emitting element layer EML, and an encapsulation layer TFEL.

The substrate SUB may be a base substrate or a base member. For example, the substrate SUB may be a flexible substrate SUB capable of being subjected to bending, folding, rolling and the like. For example, the substrate SUB may include a glass material or a metal material, but the present invention is not limited thereto. For another example, the substrate SUB may include a polymer resin such as polyimide (PI).

The thin film transistor layer TFTL may be disposed on the substrate SUB. The thin film transistor layer TFTL may include a plurality of thin film transistors constituting a pixel circuit for pixels. The thin film transistor layer TFTL may further include gate lines, data lines, power lines, gate control lines, fan-out lines, and lead lines. The fan-out lines may be for connecting the display driver 200 with the data lines. The leads lines are for connecting the display driver 200 with the pad area. When the gate driver is formed on one side of the non-display area NDA of the display panel 100, the gate driver may include thin film transistors.

The thin film transistor layer TFTL may be disposed in the display area DA, the non-display area NDA, and the sub-area SBA. The thin film transistors, the gate lines, the data lines and the power lines of each of pixels of the thin film transistor layer TFTL, may be disposed in the display area DA. The gate control lines and fan-out lines of the thin film transistor layer TFTL may be disposed in the non-display area NDA. The lead lines of the thin film transistor layer TFTL may be disposed in the sub-area SBA.

The light emitting element layer EML may be disposed on the thin film transistor layer TFTL. The light emitting element layer EML may include a plurality of light emitting elements that include a first electrode, a light emitting layer and a second electrode, which are sequentially stacked on each other to emit light, and a pixel defining layer that defines pixels. The plurality of light emitting elements of the light emitting element layer EML may be disposed in the display area DA. The light emitting layer may be an organic light emitting layer that includes an organic material. The light emitting layer may include a hole transporting layer, an organic light emitting layer, and an electron transporting layer. When the first electrode receives a predetermined voltage through the thin film transistor of the thin film transistor layer TFTL and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode electrode and the second electrode may be a cathode electrode, but the present invention is not limited thereto.

For another example, the plurality of light emitting elements may include a quantum dot light emitting diode including a quantum dot light emitting layer, or an inorganic light emitting diode including an inorganic semiconductor.

The encapsulation layer TFEL may cover the light emitting element layer EML. For example, the encapsulation layer TFEL may cover an upper surface and sides of the light emitting element layer EML and may protect the light emitting element layer EML. The encapsulation layer TFEL may include at least one inorganic layer and at least one organic layer to encapsulate the light emitting element layer EML.

The touch sensing unit TSU may be disposed on the encapsulation layer TFEL. The touch sensing unit TSU may include a plurality of touch electrodes for sensing a user's touch in a capacitance manner and touch lines for connecting the plurality of touch electrodes with the touch driver 400. For example, the touch sensing unit TSU may sense a user's touch in a self-capacitance manner or a mutual capacitance manner.

For another example, the touch sensing unit TSU may be disposed on a separate substrate that is disposed on the display unit DU. In this case, the separate substrate for supporting the touch sensing unit TSU may be a base member for encapsulating the display unit DU.

The plurality of touch electrodes of the touch sensing unit TSU may be disposed in a touch sensor area overlapped with the display area DA. The touch lines of the touch sensing unit TSU may be disposed in a touch peripheral area overlapped with the non-display area NDA.

The sub-area SBA of the display panel 100 may be extended from one side of the main area MA. The sub-area SBA may include a flexible material capable of being subjected to bending, folding, rolling and the like. For example, when the sub-area SBA is bent, the sub-area SBA may overlap the main area MA in the thickness direction (Z-axis direction). For example, when the sub-area SBA is bent, the sub-area SBA may overlap a lower surface of the display panel 100. The sub-area SBA may include a display driver 200 and a pad area connected to the circuit board 300.

Figure 5:
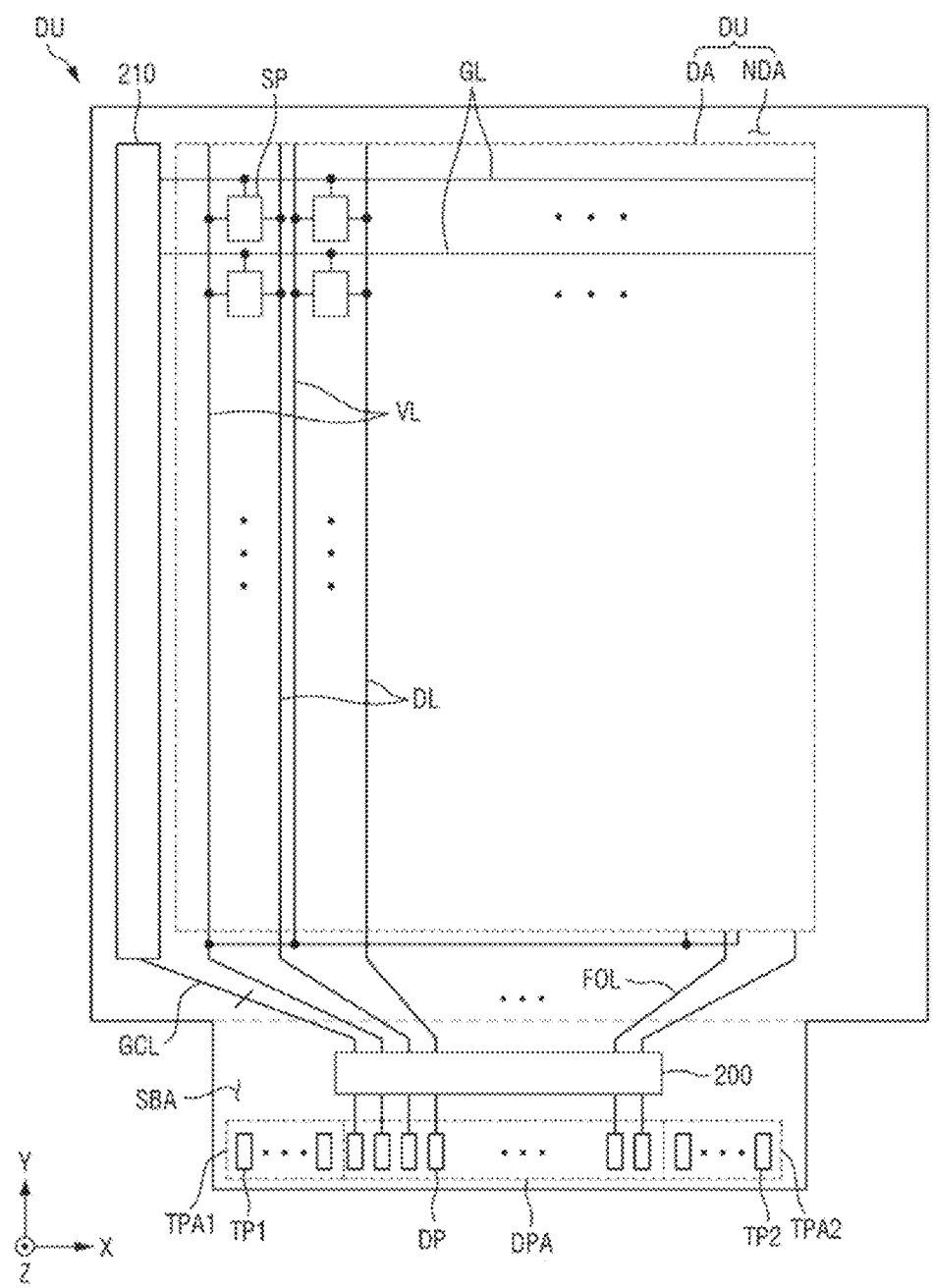
FIG. 5 is a plan view illustrating a display unit of a display device according to an embodiment of the present invention.

FIG. 5 is a plan view illustrating a display unit of a display device according to an embodiment of the present invention.

Referring to FIG. 5, the display area DA of the display unit DU is an area for displaying an image, and may be a central area of the display panel 100. The display area DA may include a plurality of pixels SP, a plurality of gate lines GL, a plurality of data lines DL, and a plurality of power lines VL. Each of the plurality of pixels SP may be a minimum unit for outputting light.

The plurality of gate lines GL may supply the gate signals received from the gate driver 210 to the plurality of pixels SP. The plurality of gate lines GL may be extended in the X-axis direction, and may be spaced apart from each other in the Y-axis direction crossing the X-axis direction.

The plurality of data lines DL may supply the data voltages received from the display driver 200 to the plurality of pixels SP. The plurality of data lines DL may be extended in the Y-axis direction, and may be spaced apart from each other in the X-axis direction.

The plurality of power lines VL may supply the power voltage received from the display driver 200 to the plurality of pixels SP. The power voltage may be at least one of a driving voltage, an initialization voltage or a reference voltage. The plurality of power lines VL may be extended in the Y-axis direction, and may be spaced apart from each other in the X-axis direction.

The non-display area NDA of the display unit DU may at least partially surround the display area DA. The non-display area NDA may include a gate driver 210, fan-out lines FOL, and gate control lines GCL. The gate driver 210 may generate a plurality of gate signals based on the gate control signals, and may sequentially supply the plurality of gate signals to the plurality of gate lines GL in accordance with a predetermined order.

The fan-out lines FOL may be extended from the display driver 200 to the display area DA. The fan-out lines FOL may supply the data voltages received from the display driver 200 to the plurality of data lines DL.

The gate control line GCL may be extended from the display driver 200 to the gate driver 210. The gate control line GCL may supply the gate control signals received from the display driver 200 to the gate driver 210.

The sub-area SBA may include a display driver 200, a display pad area DPA, and first and second touch pad areas TPA1 and TPA2.

The display driver 200 may output signals and voltages, which are for driving the display panel 100, to the fan-out lines FOL. The display driver 200 may supply the data voltages to the data lines DL through the fan-out lines FOL. The data voltages may be supplied to the plurality of pixels SP through the data lines DL, and may determine luminance of the plurality of pixels SP. The display driver 200 may supply the gate control signals to the gate driver 210 through the gate control line GCL.

The display pad area DPA, the first touch pad area TPA1 and the second touch pad area TPA2 may be disposed at an edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The display pad area DPA may include a plurality of display pad areas DP. The plurality of display pad areas DP may be connected to the main processor 500 through the circuit board 300. The plurality of display pad areas DP may be connected to the circuit board 300 to receive digital video data, and may supply the digital video data to the display driver 200.

Figure 6:
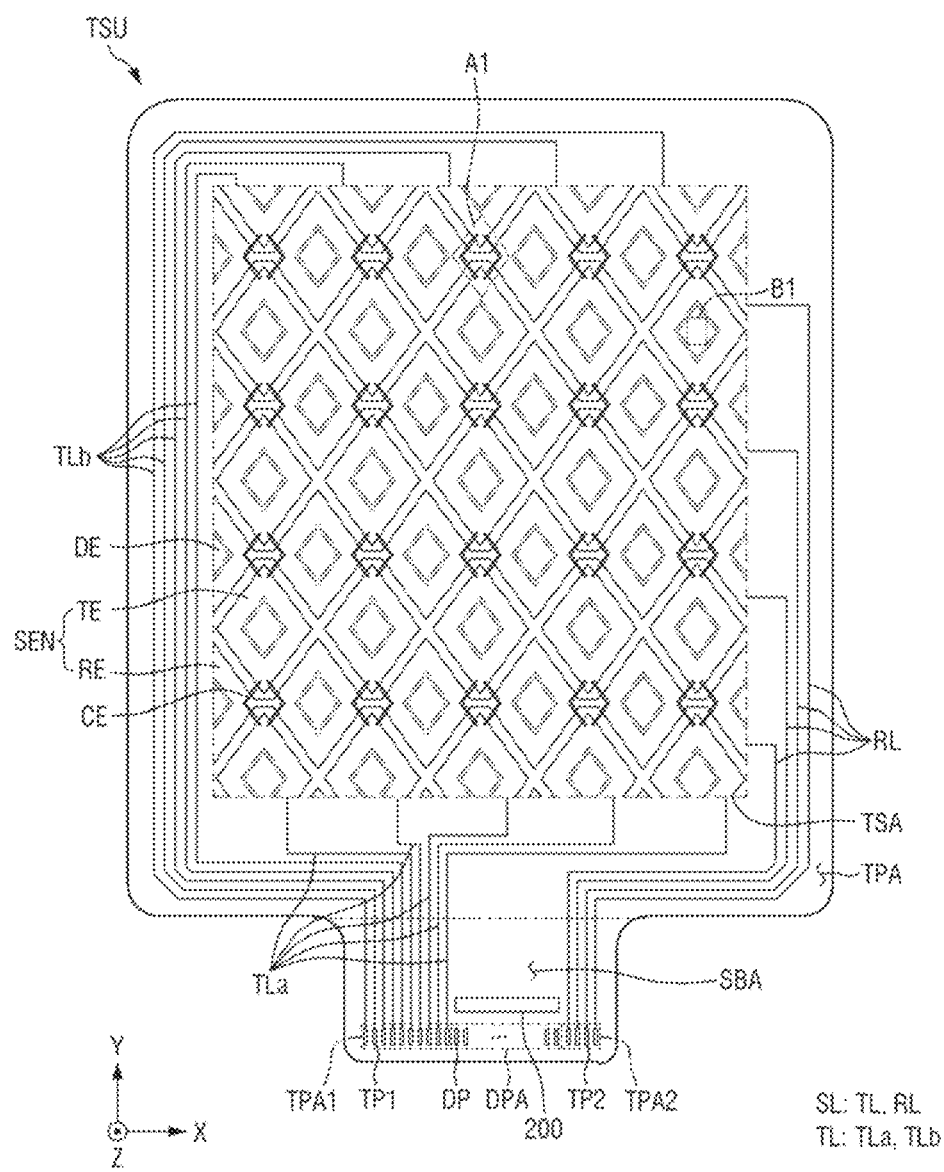
FIG. 6 is a plan view illustrating a touch sensing unit of a display device according to an embodiment of the present invention.

FIG. 6 is a plan view illustrating a touch sensing unit of a display device according to an embodiment of the present invention.

Referring to FIG. 6, the touch sensing unit TSU may include a touch sensor area TSA and a touch peripheral area TPA. The touch sensor area TSA may be for sensing a user's touch, and the touch peripheral area TPA may disposed near the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DE. The plurality of touch electrodes SEN may form mutual capacitance or self-capacitance to sense an object or a touch of a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE that are adjacent to each other in the Y-axis direction may be electrically connected to each other through a plurality of connection electrodes CE.

The plurality of driving electrodes TE may be connected to a first touch pad TP1 through a driving line TL. The driving line TL may include a lower driving line TLa and an upper driving line TLb. For example, some driving electrodes TE disposed below the touch sensor area TSA may be connected to the first touch pad TP1 through the lower driving line TLa, and other driving electrodes TE disposed above the touch sensor area TSA may be connected to the first touch pad TP1 through the upper driving line TLb. The lower driving line TLa may be extended from a lower side (or, e.g., portion) of the touch peripheral area TPA to the first touch pad TP1. For example, the lower driving line TLa may extend from a side of the touch sensor area TSA to the first touch pad TP1. The upper driving line TLb may be extended to the first touch pad TP1 via upper, left and lower sides of the touch peripheral area TPA. The first touch pad TP1 may be connected to the touch driver 400 through the circuit board 300.

The connection electrode CE may be bent at least once. For example, the connection electrode CE may have a bent shape ("<" or ">"), but its planar shape is not limited thereto. The driving electrodes TE adjacent to each other in the Y-axis direction may be connected by the plurality of connection electrodes CE, and even though any one of the connection electrodes CE is disconnected, the driving electrodes TE may be stably connected through the other connection electrodes CE. The driving electrodes TE adjacent to each other may be connected by two connection electrodes CE, but the number of the connection electrodes CE is not limited thereto.

The connection electrodes CE may be disposed in a layer different from that of the plurality of driving electrodes TE and the plurality of sensing electrodes RE. The sensing electrodes RE adjacent to each other in the X-axis direction may be electrically connected through a connection portion disposed in the same layer as the plurality of driving electrodes TE or the plurality of sensing electrodes RE. For example, the plurality of sensing electrodes RE may be extended in the X-axis direction and spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portion.

The driving electrodes TE adjacent to each other in the Y-axis direction may be electrically connected to each other through the connection electrode CE disposed in a layer different from that of the plurality of driving electrodes TE or the plurality of sensing electrodes RE. The connection electrodes CE may be formed in a rear layer (or, e.g., a lower layer) of the layer in which the driving electrodes TE and the sensing electrodes RE are formed. The connection electrodes CE are electrically connected to the driving electrodes TE adjacent to each other through a plurality of contact holes. Therefore, even though the connection electrodes CE overlap the plurality of sensing electrodes RE in the Z-axis direction, the plurality of driving electrodes TE may be insulated from the plurality of sensing electrodes RE. In addition, the connection electrode CE may be insulated from the plurality of sensing electrodes RE. Mutual capacitance may be formed between the driving electrode TE and the sensing electrode RE.

The plurality of sensing electrodes RE may be connected to a second touch pad TP2 through a sensing line RL. For example, some sensing electrodes RE disposed on a right side of the touch sensor area TSA may be connected to the second touch pad TP2 through the sensing line RL. The sensing line RL may be extended to the second touch pad TP2 via right and lower sides of the touch peripheral area TPA. The second touch pad TP2 may be connected to the touch driver 400 through the circuit board 300.

Each of the plurality of dummy electrodes DE may be surrounded by the driving electrode TE or the sensing electrode RE. Each of the plurality of dummy electrodes DE may be spaced apart from the driving electrode TE or the sensing electrode RE and insulated therefrom. Therefore, the dummy electrode DE may be electrically floated.

Position code patterns having a planar code shape are formed in partial areas of a front surface of at least one of the plurality of driving electrodes TE, the plurality of sensing electrodes RE, or the plurality of dummy electrodes DE at a predetermined interval.

The display pad area DPA, the first touch pad area TPA1 and the second touch pad area TPA2 may be disposed at the edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The first touch pad area TPA1 may be disposed on one side of the display pad area DPA, and may include a plurality of first touch pads TP1. The plurality of first touch pads TP1 may be electrically connected to the touch driver 400 disposed on the circuit board 300. The plurality of first touch pads TP1 may supply the touch driving signal to the plurality of driving electrodes TE through the plurality of driving lines TL.

The second touch pad area TPA2 may be disposed on the other side of the display pad area DPA, and may include a plurality of second touch pads TP2. The plurality of second touch pads TP2 may be electrically connected to the touch driver 400 disposed on the circuit board 300. The touch driver 400 may receive a touch sensing signal through the plurality of sensing lines RL connected to the plurality of second touch pads TP2, and may sense a mutual capacitance change between the driving electrode TE and the sensing electrode RE.

For another example, the touch driver 400 may supply the touch driving signal to each of the plurality of driving electrodes TE and the plurality of sensing electrodes RE, and may receive the touch sensing signal from each of the plurality of driving electrodes TE and the plurality of sensing electrodes RE. The touch driver 400 may sense a charge change amount of each of the plurality of driving electrodes TE and the plurality of sensing electrodes RE based on the touch sensing signal.

Figure 7:
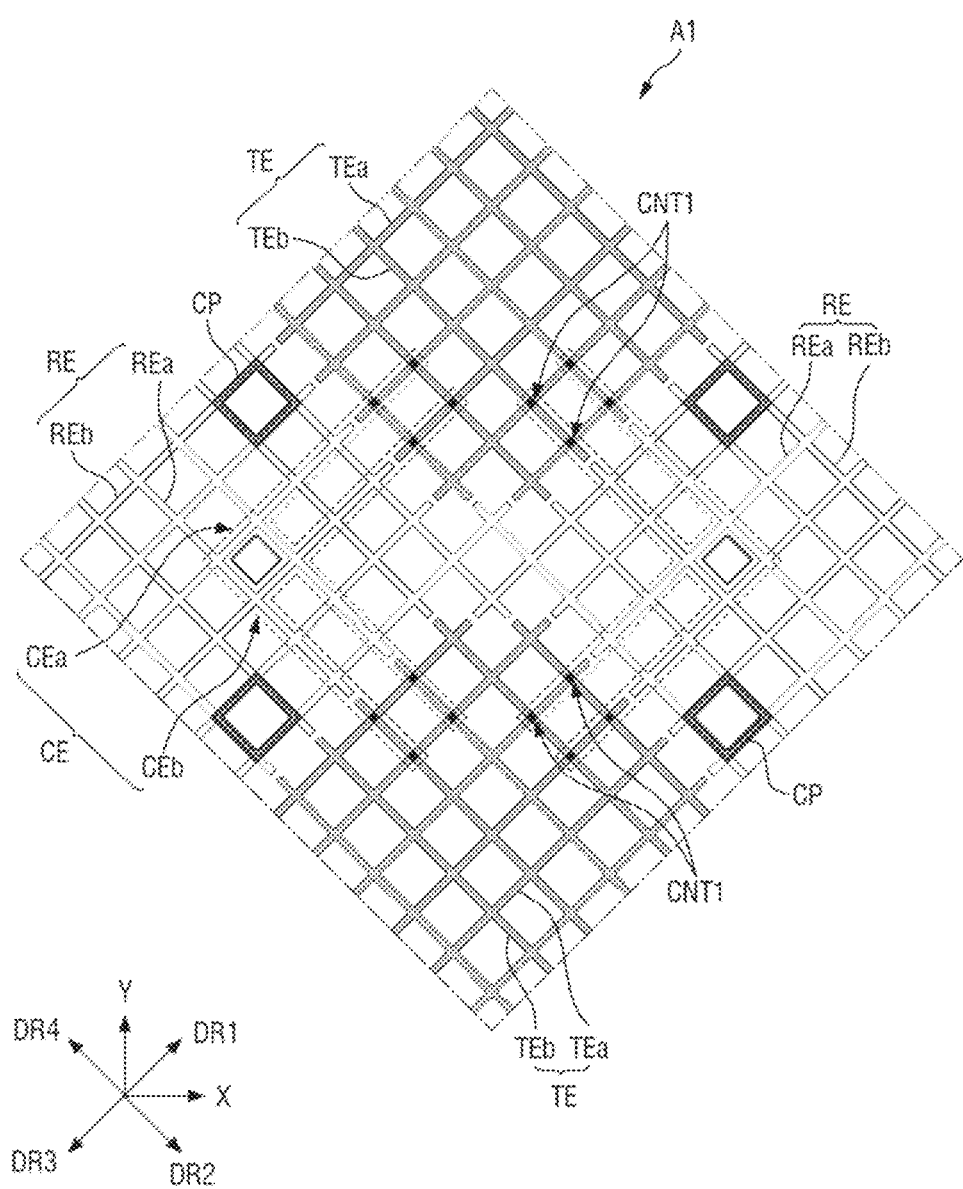
FIG. 7 is an enlarged view illustrating pattern shapes of touch electrodes and position code patterns, which are formed in an area A1 of FIG. 6.
Figure 8:
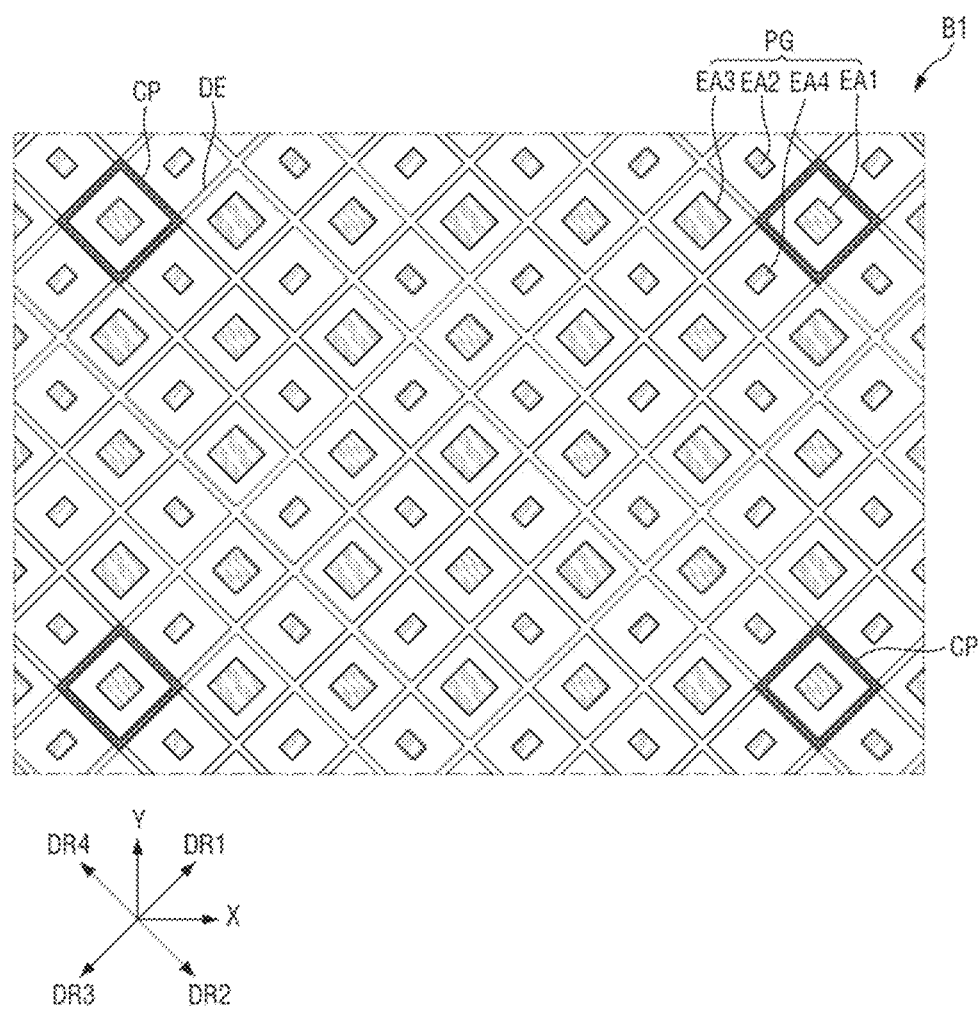
FIG. 8 is an enlarged view illustrating pattern shapes of touch electrodes and position code patterns, which are formed in an area B1 of FIG. 6.

FIG. 7 is an enlarged view illustrating pattern shapes of touch electrodes and position code patterns, which are formed in an area A1 of FIG. 6. FIG. 8 is an enlarged view illustrating pattern shapes of touch electrodes and position code patterns, which are formed in an area B1 of FIG. 6.

Referring to FIGS. 7 and 8, the plurality of driving electrodes TE, the plurality of sensing electrodes RE and the plurality of dummy electrodes DE may be disposed in the same layer, and may be spaced apart from one another.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the connection electrode CE.

The plurality of sensing electrodes RE may be extended in the X-axis direction, and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other. For example, the sensing electrodes RE may be electrically connected to each other through the connection portion, and the connection portion may be disposed within a shortest distance between adjacent driving electrodes TE in the Y-axis direction.

The plurality of connection electrodes CE may be disposed in a layer different from that of the driving electrode TE and the sensing electrode RE. The connection electrode CE may include a first portion CEa and a second portion CEb. For example, the first portion CEa of the connection electrode CE may be connected to the driving electrode TE disposed on one side of the connection electrode CE through a first contact hole CNT1 and may be extended in a third direction DR3. The second portion CEb of the connection electrode CE may be extended in a second direction DR2 by being bent from the first portion CEa in an area overlapped with the sensing electrode RE, and may be connected to the driving electrode TE disposed on the other side of the connection electrode CE through the first contact hole CNT1. Hereinafter, a first direction DR1 may be a direction between the X-axis direction and the Y-axis direction. The second direction DR2 may be a direction between an opposite direction of the Y-axis direction and the X-axis direction. The third direction DR3 may be an opposite direction of the first direction DR1, and a fourth direction DR4 may be an opposite direction of the second direction DR2. Therefore, each of the plurality of connection electrodes CE may connect the driving electrodes TE adjacent to each other in the Y-axis direction with each other.

As described above, each unit pixel PG may include first to third subpixels or first to fourth subpixels, and each of the first to fourth subpixels may include first to fourth light emission areas EA1, EA2, EA3 and EA4. For example, the first light emission area EA1 may emit light of a first color or red light, the second light emission area EA2 may emit light of a second color or a green light, and the third light emission area EA3 may emit light of a third color or blue light. The fourth light emission area EA4 may emit light of a fourth color or light of any one of the first to third colors, but these light emission areas are not limited thereto.

Each unit pixel PG may express a white gray scale through the first to third light emission areas EA1 to EA3, or the first to fourth light emission areas EA1, EA2, EA3 and EA4. A gray scale of various colors such as a white gray scale may be expressed by combination of light emitted from the first to fourth light emission areas EA1, EA2, EA3 and EA4.

The plurality of driving electrodes TE, the plurality of sensing electrodes RE and the plurality of dummy electrodes DE may be formed in a planar mesh structure or a netted structure in accordance with the arrangement structure of the first to third subpixels or the first to fourth subpixels.

The plurality of driving electrodes TE, the plurality of sensing electrodes RE and the plurality of dummy electrodes DE may surround portions between the first to third light emission areas EA1, EA2 and EA3 or the first to fourth light emission areas EA1, EA2, EA3 and EA4, which constitute the unit pixel PG on a plane, or a periphery thereof. Therefore, the plurality of driving electrodes TE, the plurality of sensing electrodes RE and the plurality of dummy electrodes DE might not overlap the first to fourth light emission areas EA1, EA2, EA3 and EA4. The plurality of connection electrodes CE might not overlap the first to fourth light emission areas EA1, EA2, EA3 and EA4, either. Therefore, the display device 10 may prevent luminance of light emitted from the first to fourth light emission areas EA1, EA2, EA3 and EA4 from being reduced by the touch sensing unit TSU.

Each of the plurality of driving electrodes TE may be formed to include a first portion TEa that is extended in the first direction DR1 and a second portion TEb that is extended in the second direction DR2, and thus might not overlap the first to fourth light emission areas EA1, EA2, EA3 and EA4. Each of the plurality of sensing electrodes RE may be formed to include a first portion REa that is extended in the first direction DR1 and a second portion REb that is extended in the second direction DR2, and thus might not overlap the first to fourth light emission areas EA1, EA2, EA3 and EA4. The plurality of dummy electrodes DE are also formed to not overlap the first to fourth light emission areas EA1, EA2, EA3 and EA4.

Position code patterns CP are formed on a portion of a front surface of each of the plurality of dummy electrodes DE, the plurality of driving electrodes TE and the plurality of sensing electrodes RE, which correspond to preset position code pattern forming areas. For example, the position code patterns CP may be formed in partial areas of the front surfaces of the plurality of dummy electrodes DE, the plurality of driving electrodes TE and the plurality of sensing electrodes RE at predetermined intervals (e.g., an interval of about 300 μm). Each of the position code patterns CP is formed in a planar code shape or planar code pattern shape of a predetermined size. The position code patterns CP may be formed to minimize reflectance of infrared light applied from the position input device 20 by shielding or absorbing the infrared light, and may be recognized as those of the position input device 20 in accordance with the planar code shape that minimizes reflectance of the infrared light.

The planar code shape of the position code patterns CP may be formed in at least one polygonal pattern shape such as a rectangle, a square, a circle, a semi-circle, a fan, or a rhombus, or may be formed in a pattern shape in which a plurality of polygonal pattern shapes are combined. In addition, the planar code shape of the position code patterns CP may be formed in a closed loop pattern shape such as a rectangle, a square, a rhombus, a pentagon and a hexagon and may surround at least one light emission area EA1, EA2, EA3, and/or EA4. For example, the position code pattern CP may have a square annular shape that surrounds at least one light emission area EA1, EA2, EA3, and/or EA4. Unlike this case, the planar code pattern shape of the position code patterns CP may be formed in an open loop pattern shape surrounding only a portion of the at least one light emission area. In addition, the planar code shape of the position code patterns CP may be formed in a straight or curved pattern shape having a predetermined length. In addition, when the position code patterns CP surround portions between the plurality of light emission areas and the periphery of the plurality of light emission areas rather than one light emission area, the shape of the respective positon code patterns CP may be formed in a planar mesh pattern structure and a planar netted pattern structure.

Figure 9:
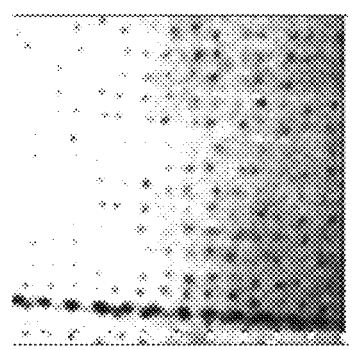
FIG. 9 is a view illustrating a pattern shape image based a change in a slope angle between a display panel and a position input device.
Figure 9:
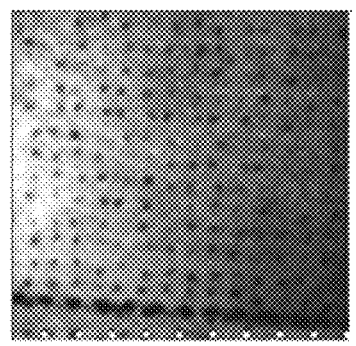
Figure 9:
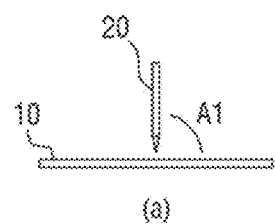
Figure 9:
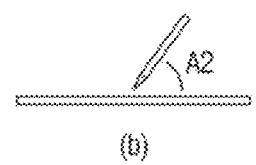
Figure 9:
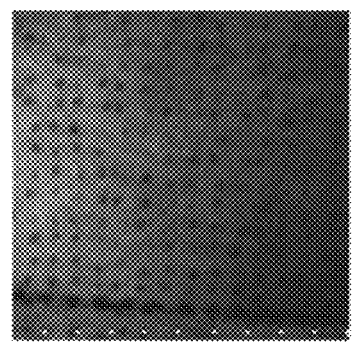
Figure 9:
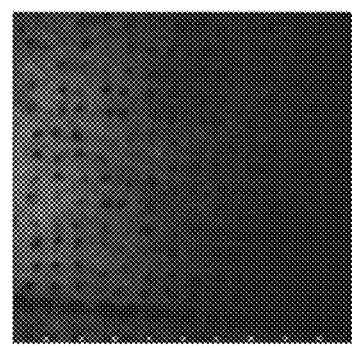
Figure 9:
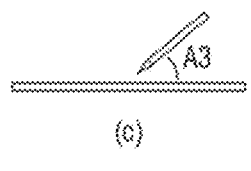
Figure 9:
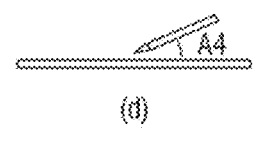

FIG. 9 is a view illustrating a pattern shape image based on a change in a slope angle between a display panel and a position input device.

Referring to FIG. 9, as the arrangement angle between the display panel 100 and the position input device 20, that is, the slope angle is vertical A1 or close to vertical, an incident angle and a reflective angle, which are emitted and incident from the position input device 20, may be increased. Therefore, as the slope angle between the display panel 100 and the position input device 20 is vertical A1 or close to the vertical, light saturation is generated, whereby pattern definition of the pattern shape image obtained by detecting the position code patterns CP may be deteriorated.

In addition, as the slope angle between the display panel 100 and the position input device 20 is reduced to form a smaller acute angle, the incident angle and the reflective angle, which are emitted and incident from the position input device 20, may be reduced. For example, when the size of the acute angle is varied in the order of A1>A2>A3>A4, the light receiving amount of reflected light is minimized at the slope angle A4 that is the smallest acute angle, whereby pattern visibility of the pattern shape image may be more deteriorated.

Figure 10:
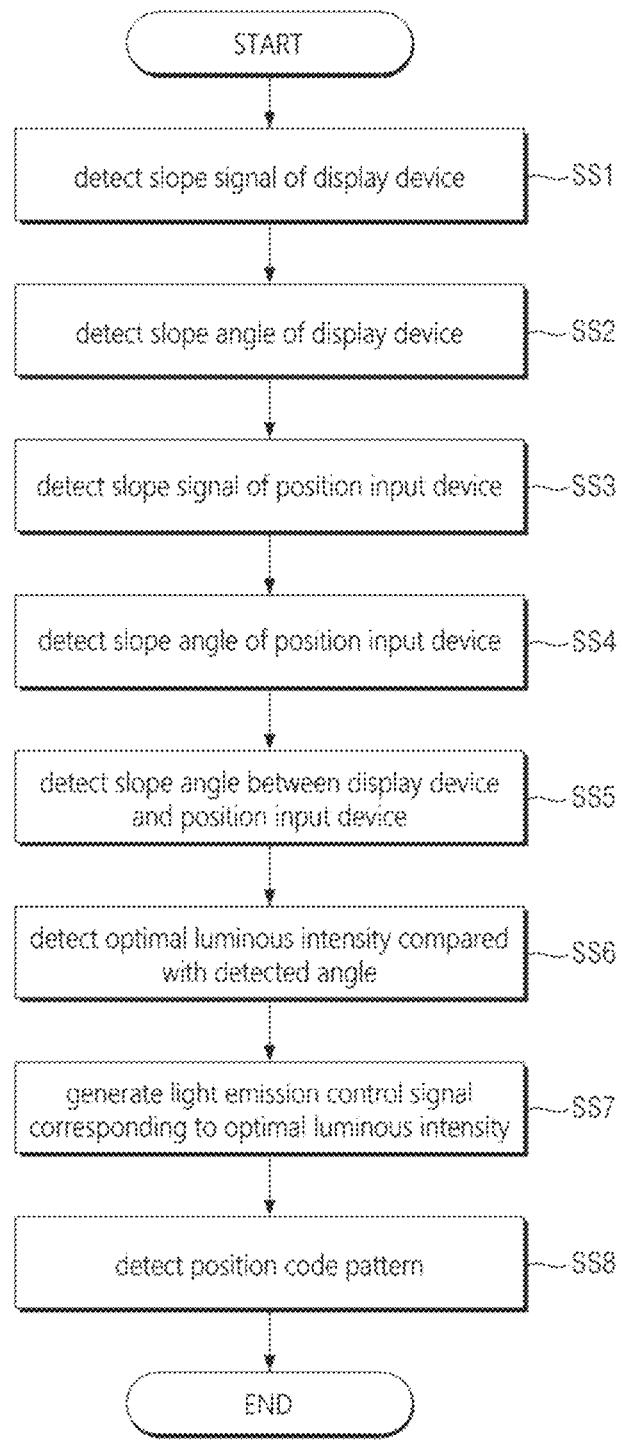
FIG. 10 is a flow chart illustrating a method of detecting position code patterns of a position input device according to an embodiment of the present invention.
Figure 11:
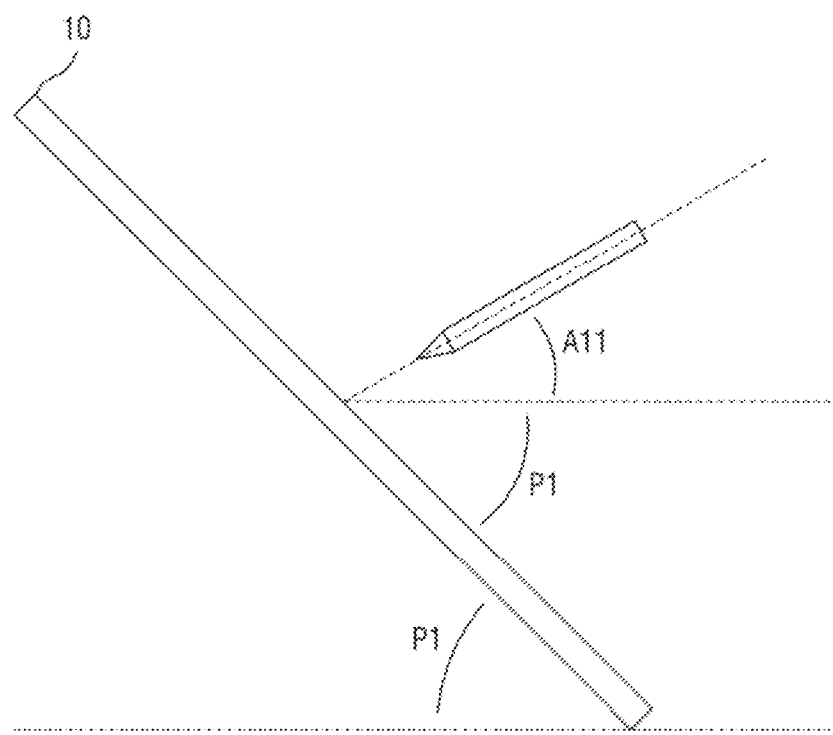
FIG. 11 is a view illustrating a method of converting and detecting a slope angle between a display panel and a position input device.

FIG. 10 is a flow chart illustrating a method of detecting position code patterns of a position input device according to an embodiment of the present invention. FIG. 11 is a view illustrating a method of converting and detecting a slope angle between a display panel and a position input device.

Referring to FIGS. 10 and 11, the first slope detector 560 embedded in the display panel 100 detects a slope signal of the display panel 100 by using at least one of an acceleration sensor, a gyro sensor, a slope sensor, or a gravity sensor (SS1). Then, the first slope detector 560 converts the detected slope signal into a digital signal by an AD conversion circuit or the like, and converts and detects the slope angle of the display panel 100 (SS2). The first slope detector 560 supplies the detected slope angle information of the display panel 100 to the main processor 500 and the communication unit 600.

In addition, the second slope detector 27 embedded in the position input device 20 detects the slope signal of the position input device 20 by using at least one of an acceleration sensor, a gyro sensor, a slope sensor, or a gravity sensor (SS3). Then, the second slope detector 27 converts the detected slope signal into a digital signal to convert and detect the slope angle of the position input device 20 (SS4). The second slope detector 27 supplies the slope angle information of the position input device 20 to the code processor 23.

The code processor 23 uses and computes slope angle information P1 of the display panel 100 and slope angle information A11 of the position input device 20 to detect and convert the slope angle information of the position input device 20 disposed on the front surface of the display panel 100 as compared with the display panel 100. At this time, the code processor 23 may compute the slope angle information P1 of the display panel 100 and the slope angle information A11 of the position input device 20 by using a preset computation manner such as a summing manner to detect the slope angle information between the display panel 100 and the position input device 20 in real time (SS5).

Figure 12:
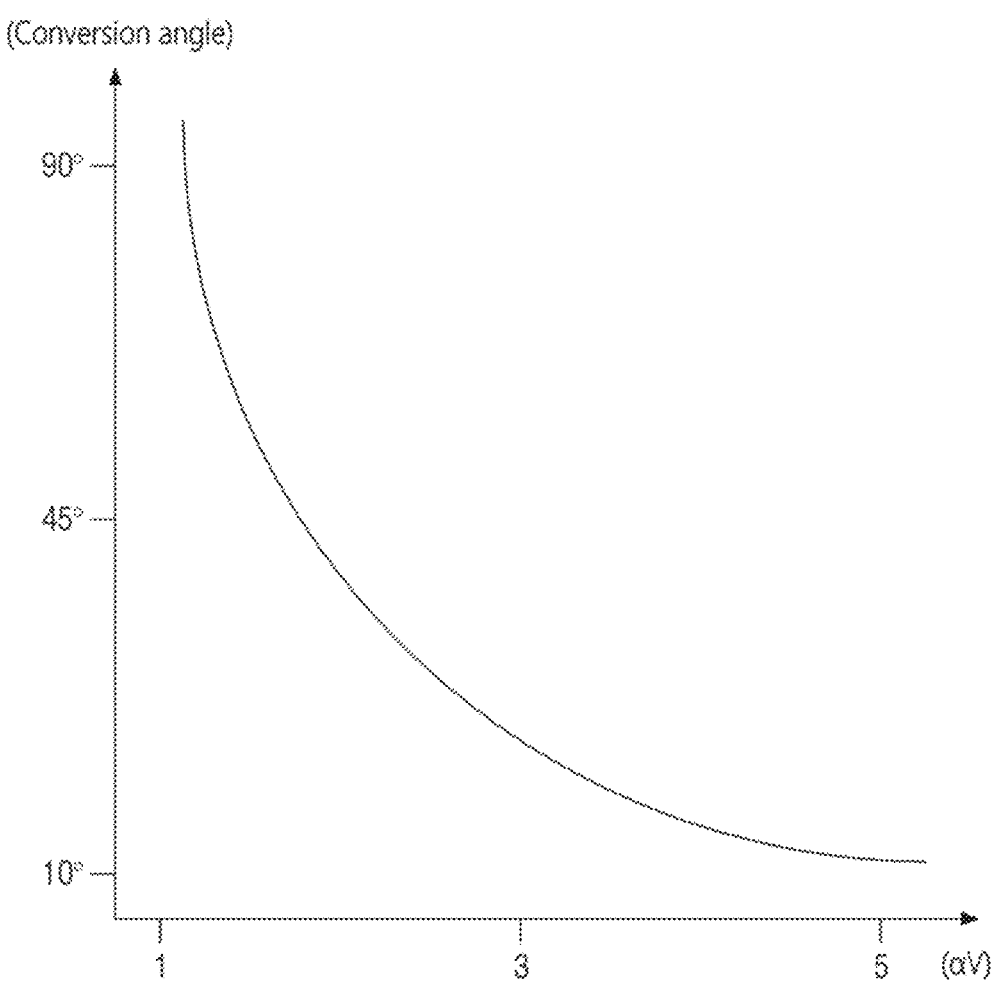
FIG. 12 is a graph illustrating a method of changing an infrared luminous intensity based on a change in a slope angle between a display panel and a position input device.

FIG. 12 is a graph illustrating a method of changing an infrared luminous intensity based on a change in a slope angle between a display panel and a position input device.

Referring to FIG. 12, the code processor 23 reads infrared light emission data of the light emitting unit 21(a), which is preset in accordance with the change in the slope angle between the display panel 100 and the position input device 20, from an internal memory or the external memory 25. In this case, the preset infrared light emission data of the light emitting unit 21(a) includes preset infrared luminous intensity setting values so that an optimal pattern shape image may be detected for each slope angle between the display panel 100 and the position input device 20.

When the arrangement angle information between the display panel 100 and the position input device 20 is sequentially calculated, the code processor 23 sequentially reads the infrared luminous intensity setting values corresponding to the calculated slope angle change from the memory 25 (SS6). The code processor 23 generates and modulates the light emission control signal in real time to adjust the infrared light emission amount or light emission intensity of the light emitting unit 21(a) in accordance with the read infrared luminous intensity setting values. At this time, the code processor 23 may modulate the amplitude and pulse width of the light emission control signal so that the infrared luminous intensity or wavelength band characteristics of the light emitting unit 21(a) may be changed in accordance with the change in the arrangement angle of the position input device 20 as compared with the display panel 100 (SS7).

For example, as shown in FIG. 12, the code processor 23 may modulate the light emission control signal such that the infrared luminous intensity or wavelength band of the light emitting unit 21(a) may be changed in inversely proportional to the change in the arrangement angle information of the position input device 20 as compared with the display panel 100. The code processor 23 may supply the modulated light emission control signal to the light emitting driver 26.

Then, the light emitting driver 26 supplies a light emitting driving signal having a size corresponding to the light emission control signal to the light emitting unit 21(a) of the code detector 21 in response to the light emission control signal input from the code processor 23. Therefore, the light emitting unit 21(a) may emit infrared light so that the infrared luminous intensity, light emitting period, and the light emitting wavelength band may be changed in response to an input period and a size of the light emitting driving signal input from the light emitting driver 26.

The light receiving unit 21(b) of the code detector 21 converts an optical image formed by receiving the infrared reflective light into an electrical image signal to generate pattern shape image data including images of the position code patterns. The light receiving unit 21(b) may provide the code processor 23 with the position code pattern shape image. Therefore, the position input device 20 may detect pattern shape images for the position code patterns CP by using the infrared luminous intensity set and modulated to detect a pattern shape image for each slope angle between the display panel 100 and the position input device 20.

Figure 13:
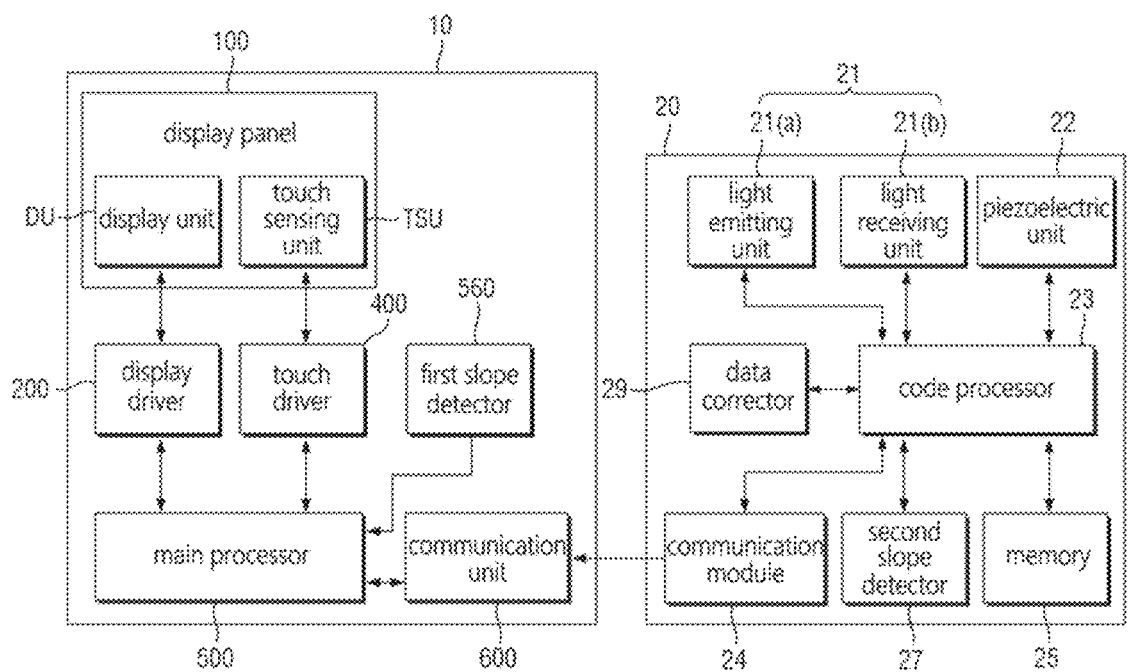
FIG. 13 is a schematic block view illustrating a display device and a position input device, which are shown in FIG. 1.

FIG. 13 is a schematic block view illustrating a display device and a position input device, which are shown in FIG. 1.

Referring to FIG. 13, the position input device 20 may further include a data corrector 29 for modulating the pattern shape image data detected from the code detector 21 in response to a change in the arrangement angle (or slope angle) of the position input device 20 disposed on the front surface of the display panel 100 with respect to the display panel 100. In addition, the data corrector 29 may supply the modulated pattern shape image data to the code processor 23.

Therefore, the code processor 23 may extract data codes corresponding to the arrangement structure and shape of the position code patterns from the pattern shape image modulated through the data corrector 29, and may combine the data codes to extract or generate position coordinate data corresponding to the combined data codes.

Figure 14:
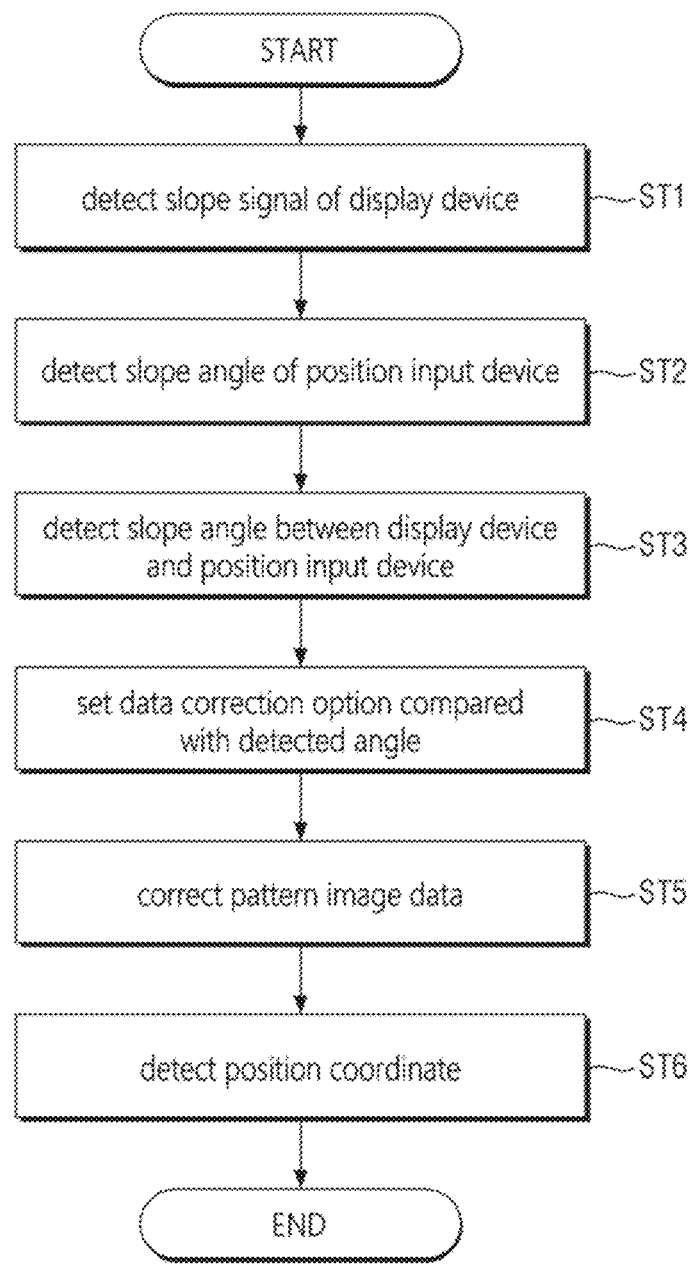
FIG. 14 is a flow chart illustrating a method of detecting position code patterns of a position input device according to an embodiment of the present invention.
Figure 15:
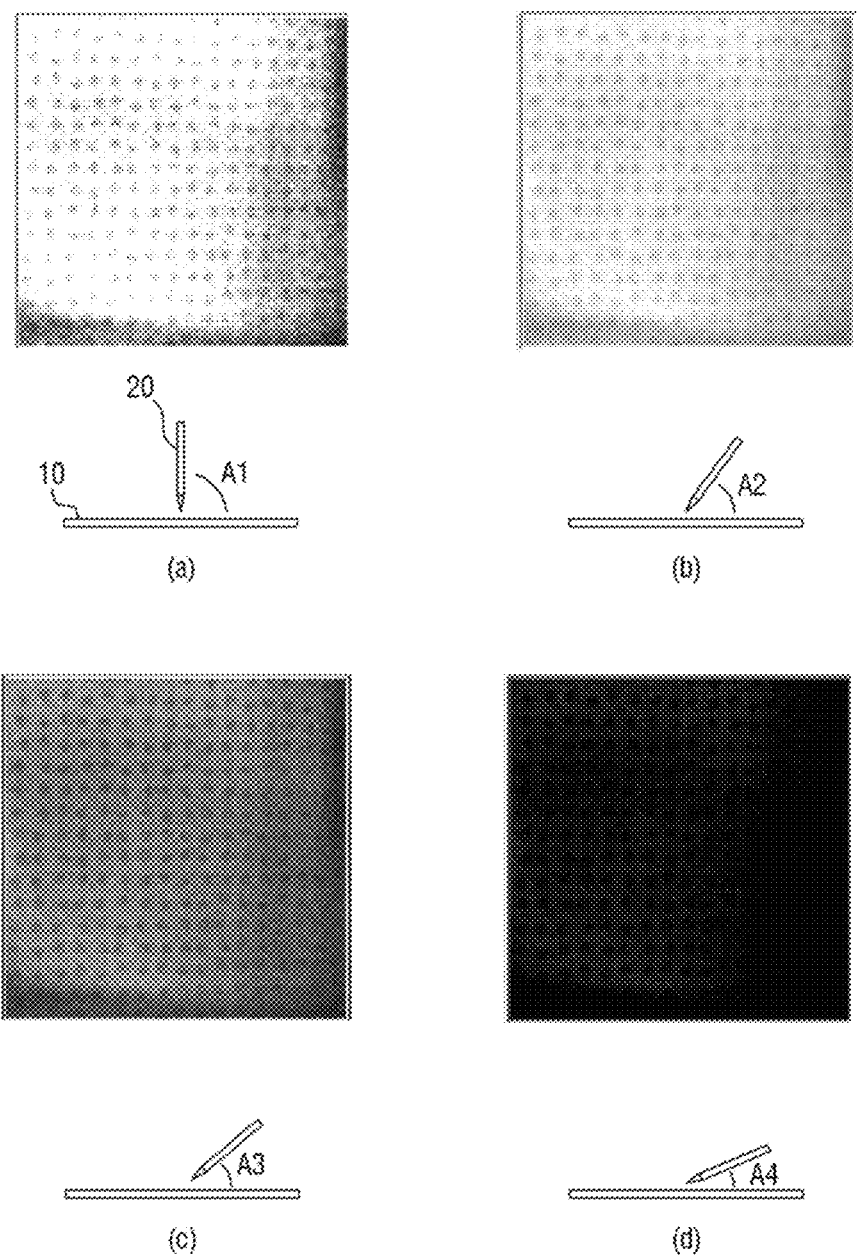
FIG. 15 is a view illustrating a pattern shape image based a change in a slope angle between a display panel and a position input device according to an embodiment of the present invention.

FIG. 14 is a flow chart illustrating a method of detecting position code patterns of a position input device according to an embodiment of the present invention. FIG. 15 is a view illustrating a pattern shape image based on a change in a slope angle between a display panel and a position input device.

Referring to FIGS. 14 and 15, the first slope detector 560 embedded in the display panel 100 detects a slope signal of the display panel 100 by using at least one sensor, and converts the detected slope signal into a digital signal to convert and detect a slope angle of the display panel 100 (ST1).

In addition, the second slope detector 27 embedded in the position input device 20 detects the slope signal of the position input device 20 by using at least one sensor, and converts the detected slope signal into a digital signal to convert and detect the slope angle of the position input device 20 (ST2).

The code processor 23 computes the slope angle information P1 of the display panel 100 and the slope angle information A11 of the position input device 20 in a preset computation manner to detect and convert the slope angle information of the position input device 20 disposed on the front surface of the display panel 100 with respect to the display panel 100. The code processor 23 transmits the detected slope angle information of the position input device 20 disposed on the front surface of the display panel 100 with respect to the display panel 100 to the data corrector 29 in real time (ST3).

As shown in FIG. 15, as the slope angle between the display panel 100 and the position input device 20 is vertical A1 or close to vertical, light saturation is generated, whereby pattern definition of the pattern shape image obtained by detecting the position code patterns CP may be deteriorated. In addition, as the slope angle between the display panel 100 and the position input device 20 is reduced to form a smaller acute angle, the received amount of light of reflected light is minimized, whereby pattern visibility of the pattern shape image may be more deteriorated.

For correction of the pattern shape image, the data corrector 29 receives the pattern shape image data generated in real time from the light receiving unit 21(*b*) of the code detector 21 in real time. The data corrector 29 receives the slope angle information of the position input device 20 disposed on the front surface of the display panel 100 with respect to the display panel 100 from the code processor 23 in real time.

Figure 17:
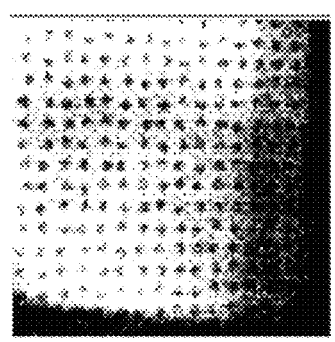
FIG. 17 is a view illustrating a pattern shape image in which maximum and minimum gray scales are modulated in accordance with a slope angle.
Figure 17:
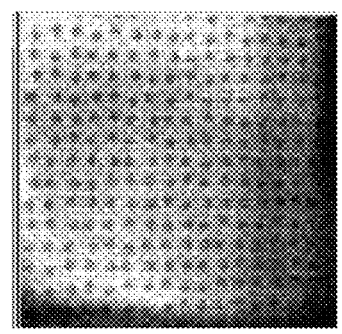
Figure 17:
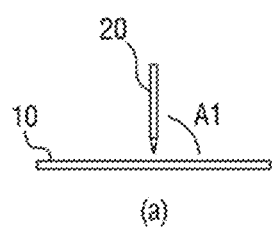
Figure 17:
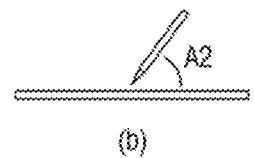
Figure 17:
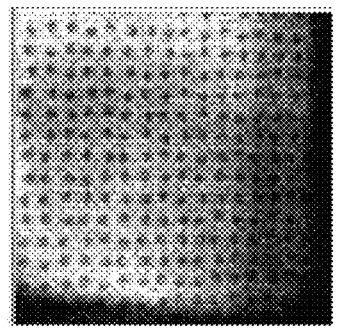
Figure 17:
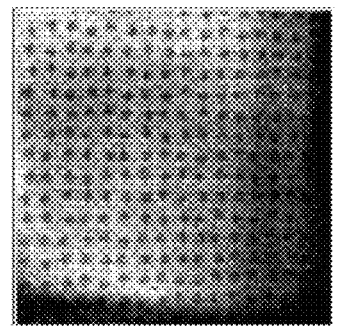
Figure 17:
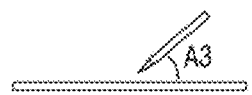
Figure 17:
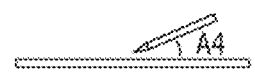

FIG. 16 is a view illustrating a method of modulating maximum and minimum gray scales of pattern shape images based on a change in a slope angle between a display panel and a position input device. FIG. 17 is a view illustrating a pattern shape image in which maximum and minimum gray scales are modulated in accordance with a slope angle.

Referring to FIGS. 16 and 17, the data corrector 29 selects a modulation method and a modulation option for modulating the pattern shape image data in response to the slope angle information of the position input device 20 disposed on the front surface of the display panel 100 with respect to the display panel 100.

For example, the data corrector 29 compares the slope angle of the position input device 20 disposed on the front surface of the display panel 100 with respect to the display panel 100 with a plurality of preset angle range information. In addition, the data corrector 29 may variably set a range (dynamic range) of maximum and minimum gray scale values of the pattern shape image to correspond to range information including the arrangement angle between the display panel 100 and the position input device 20 (ST4).

For example, since light saturation may be generated as the slope angle between the display panel 100 and the position input device 20 is vertical A1 or close to vertical, the data corrector 29 may further narrow the range of the maximum and minimum gray scale values of the pattern shape image as the slope angle is close to vertical A1. In addition, as the slope angle between the display panel 100 and the position input device 20 is reduced to form an acute angle, the image may become darker, whereby the range of the maximum and minimum gray scale values of the pattern shape image may be set to be wider.

Afterwards, the data corrector 29 modulates the gray scale values of the pattern shape image data so that the gray scale values of the pattern shape image are included within the range of the maximum and minimum gray scale values that are variably set (ST5). The data corrector 29 may transmit the pattern shape image data, in which the range of the gray scale values is modulated, to the code processor 23, and the code processor 23 may detect the pattern shape image for the position code patterns CP from the pattern shape image modulated by optimizing the range of the gray scale values for each slope angle between the display panel 100 and the position input device 20. For example, the code processor 23 may extract data codes corresponding to the arrangement structure and shape of the position code patterns from the pattern shape image for the position code patterns CP, and may combine the data codes to extract or generate position coordinate data corresponding to the combined data codes.

In addition, the data corrector 29 may differently select a modulation method and a modulation option for modulating the pattern shape image data in response to the slope angle information of the position input device 20 disposed on the front surface of the display panel 100 with respect to the display panel 100.

Figure 18:
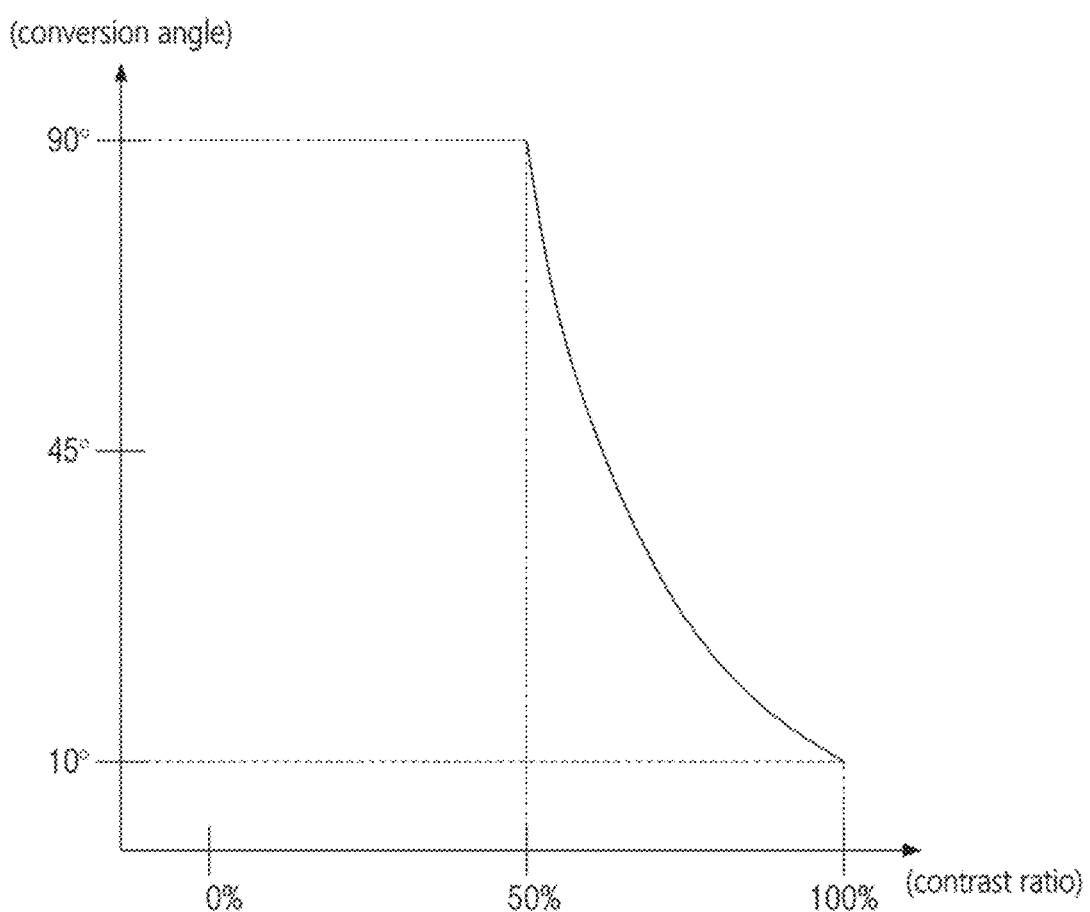
FIG. 18 is a view illustrating a method of modulating a contrast of a pattern shape image based a change in a slope angle between a display panel and a position input device.
Figure 19:
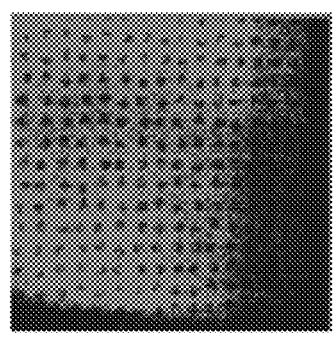
FIG. 19 is a view illustrating a pattern shape image in which a contrast ratio is modulated in accordance with a slope angle.
Figure 19:
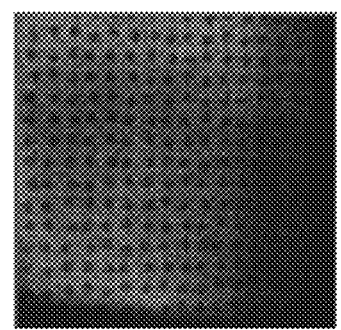
Figure 19:
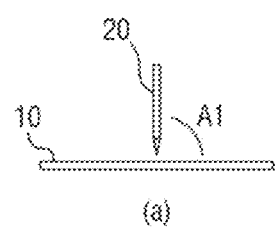
Figure 19:
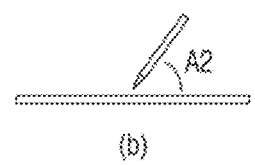
Figure 19:
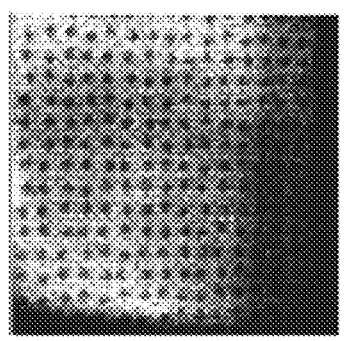
Figure 19:
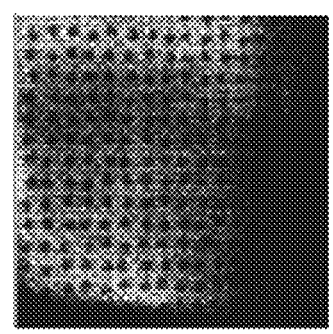
Figure 19:
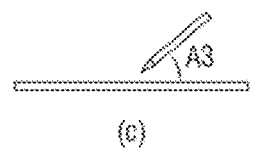
Figure 19:
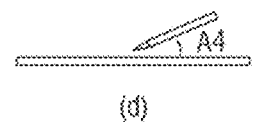

FIG. 18 is a view illustrating a method of modulating a contrast of a pattern shape image based on a change in a slope angle between a display panel and a position input device. FIG. 19 is a view illustrating a pattern shape image in which a contrast ratio is modulated in accordance with a slope angle.

Referring to FIGS. 18 and 19, the data corrector 29 may variably set a contrast difference or ratio of the pattern shape image, that is, a gap or ratio between a maximum gray scale value and a minimum gray scale value so as to correspond to the slope angle of the position input device 20 disposed on the front surface of the display panel 100 with respect to the display panel 100 (ST4).

For example, since light saturation may be generated as the slope angle between the display panel 100 and the position input device 20 is vertical A1 or close to vertical, the data corrector 29 may reduce the contrast ratio so that the difference or ratio between the maximum gray scale value and the minimum gray scale value of the pattern shape image becomes lower as the slope angle is close to the vertical A1. In addition, as the slope angle between the display panel 100 and the position input device 20 is reduced to form an acute angle, the image may become darker, whereby the data corrector 29 may increase the contrast ratio so that the difference or ratio between the maximum gray scale value and the minimum gray scale value of the pattern shape image becomes larger.

Afterwards, the data corrector 29 modulates the gray scale values of the pattern shape image in accordance with the contrast ratio that is variably set (ST5). The data corrector 29 may transmit the pattern shape image data, in which the contrast ratio is modulated, to the code processor 23, and the code processor 23 may detect the pattern shape image for the position code patterns CP from the pattern shape image in which the contrast ratio is modulated for each slope angle between the display panel 100 and the position input device 20. In addition, the code processor 23 may extract data codes corresponding to the arrangement structure and shape of the position code patterns from the pattern shape image for the position code patterns CP, and may combine the data codes to extract or generate position coordinate data corresponding to the combined data codes.

Figure 20:
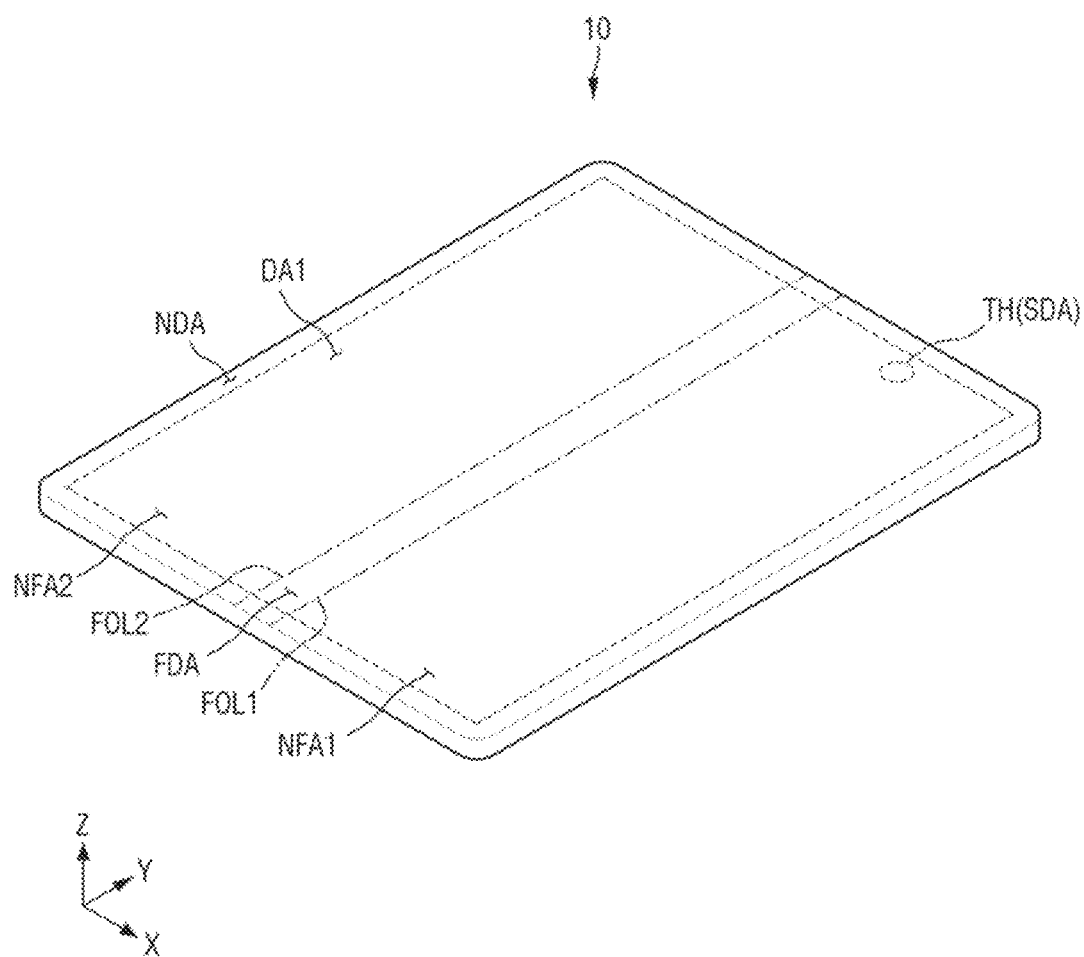
FIGS. 20 and 21 are perspective views illustrating a display device according to an embodiment of the present invention.
Figure 21:
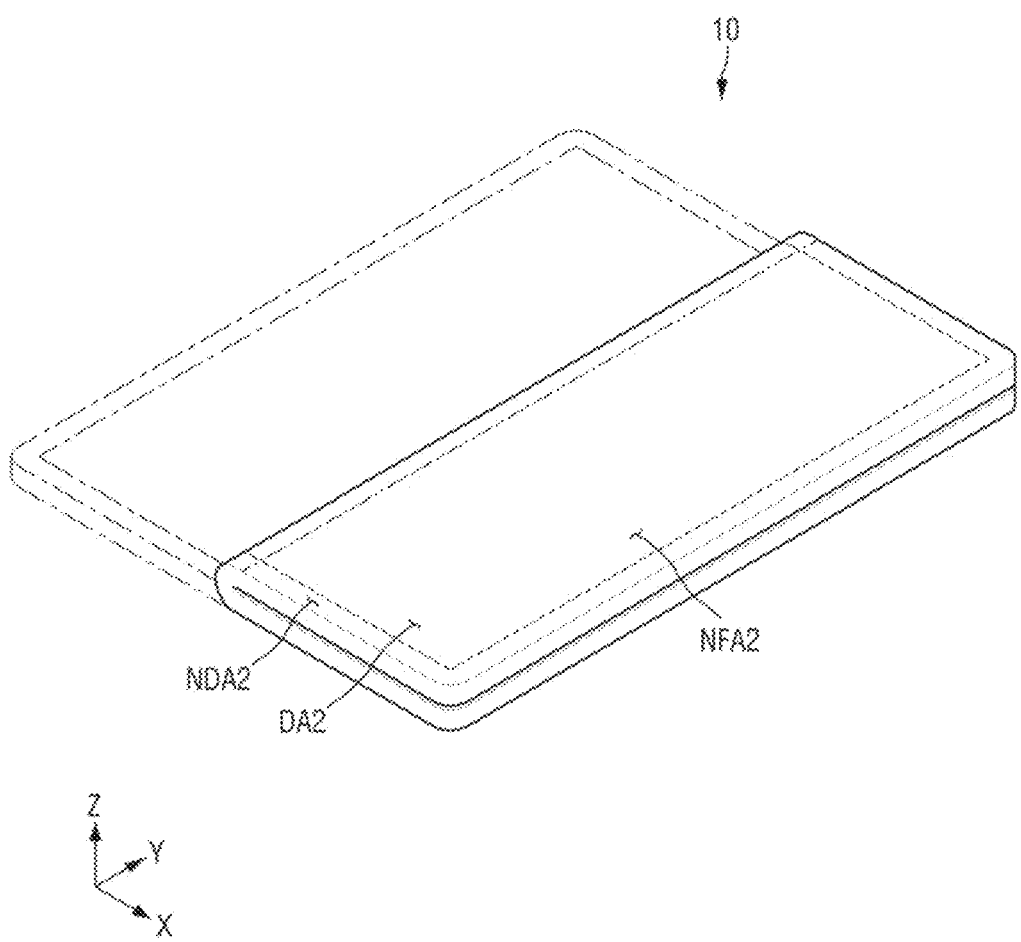

FIGS. 20 and 21 are perspective views illustrating a display device according to an embodiment of the present invention.

FIGS. 20 and 21 illustrate that the display device 10 is a foldable display device in which the display device 10 is folded in the first direction (X-axis direction). The display device 10 may maintain both a folded state and an unfolded state. The display device 10 may be folded in an in-folding manner in which the front surface is disposed inside. When the display device 10 is bent or folded in an in-folding manner, front surfaces of the display device 10 may be disposed to face each other. In addition, the display device 10 may be folded in an out-folding manner in which the front surface is disposed outside. When the display device 10 is bent or folded in an out-folding manner, rear surfaces of the display device 10 may be disposed to face each other or the front surfaces may be disposed to face way from each other.

A first non-folding area NFA1 may be disposed on one side of a folding area FDA, for example, on a right side thereof. A second non-folding area NFA2 may be disposed on the other side of the folding area FDA, for example, on a left side thereof. The touch sensing unit TSU according to an embodiment of the present invention may be formed and disposed on the first non-folding area NFA1 and the second non-folding area NFA2, respectively.

A first folding line FOL1 and a second folding line FOL2 may be extended in the second direction (Y-axis direction), and the display device 10 may be folded in the first direction (X-axis direction). As a result, since a length of the display device 10 in the first direction (X-axis direction) may be reduced to half, approximately, a user may conveniently carry the display device 10.

The extended direction of the first folding line FOL1 and the extended direction of the second folding line FOL2 are not limited to the second direction (Y-axis direction). For example, the first folding line FOL1 and the second folding line FOL2 may be extended in the first direction (X-axis direction), and the display device 10 may be folded in the second direction (Y-axis direction). In this case, the length of the display device 10 in the second direction (Y-axis direction) may be reduced to half, approximately. In addition, the first folding line FOL1 and the second folding line FOL2 may be extended in a diagonal direction of the display device 10 between the first direction (X-axis direction) and the second direction (Y-axis direction). In this case, the display device 10 may be folded in a triangular shape.

When the first folding line FOL1 and the second folding line FOL2 are extended in the second direction (Y-axis direction), the length of the folding area FDA in the first direction (X-axis direction) may be shorter than that of the folding area FDA in the second direction (Y-axis direction). In addition, the length of the first non-folding area NFA1 in the first direction (X-axis direction) may be longer than that of the folding area FDA in the first direction (X-axis direction). The length of the second non-folding area NFA2 in the first direction (X-axis direction) may be longer than that of the folding area FDA in the first direction (X-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1 and the second non-folding area NFA2 of the display device 10.

The second display area DA2 may be disposed on the rear surface or an outward facing surface of the display device 10, when the display device 10 is folded. The second display area DA2 may overlap the second non-folding area NFA2. Therefore, when the display device 10 is folded, an image may be displayed in a front direction in the second non-folding area NFA2 of the display device 10.

Although FIG. 20 and FIG. 21 illustrate that a through hole TH in which a camera SDA or the like is formed is disposed in the first non-folding area NFA1, the present invention is not limited thereto. The through hole TH or the camera SDA may be disposed in the second non-folding area NFA2 or the folding area FDA.

Figure 22:
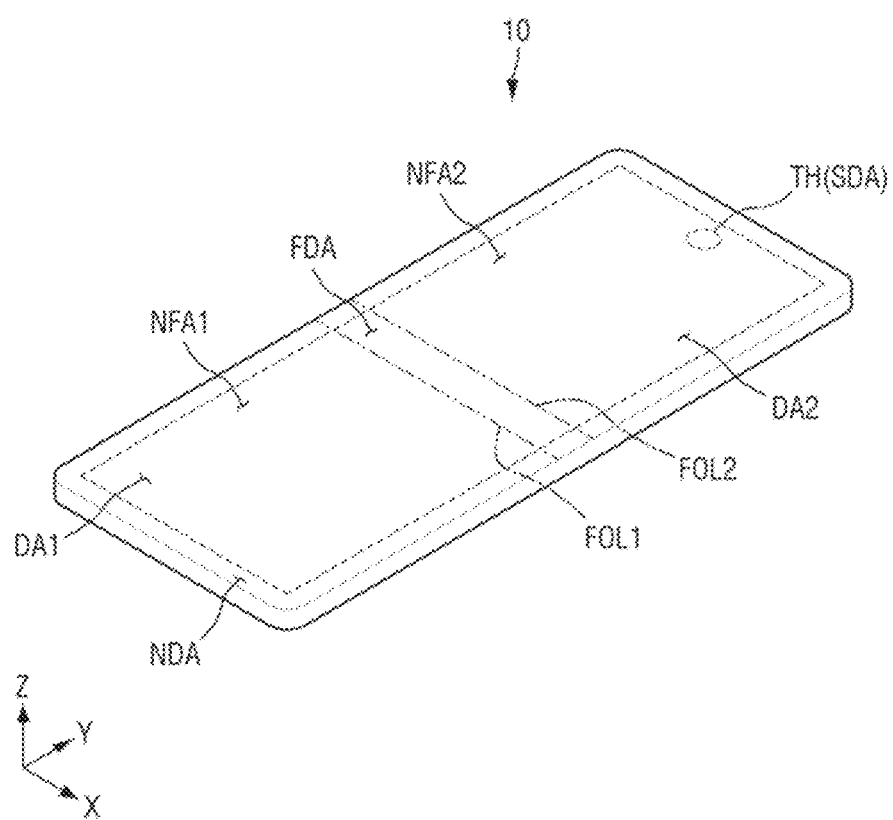
FIGS. 22 and 23 are perspective views illustrating a display device according to an embodiment of the present invention.
Figure 23:
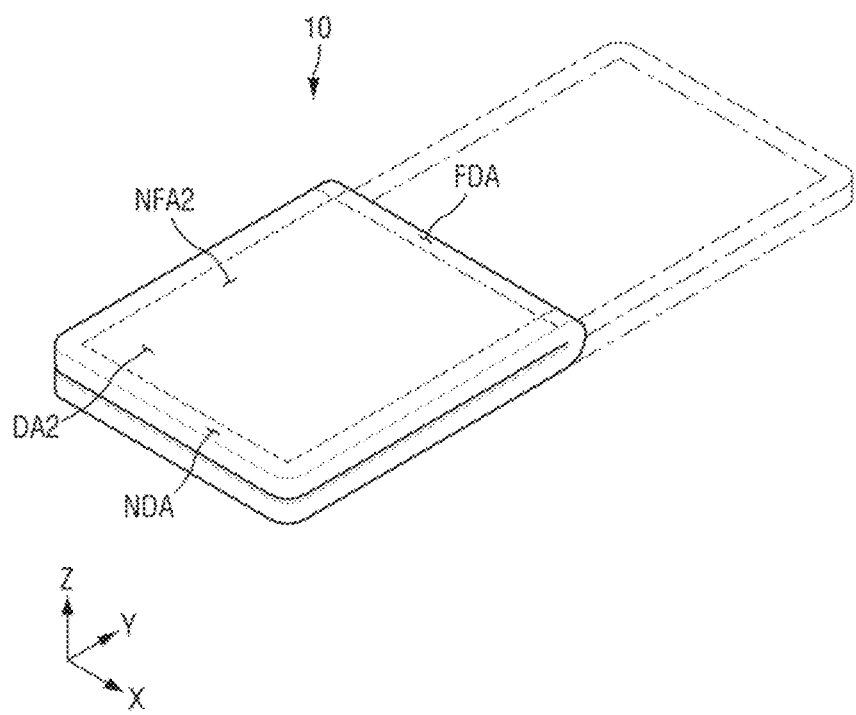

FIGS. 22 and 23 are perspective views illustrating a display device according to an embodiment of the present invention.

FIGS. 22 and 23 illustrate that the display device 10 is a foldable display device that is folded in the second direction (Y-axis direction). The display device 10 may maintain both the folded state and the unfolded state. The display device 10 may be folded in an in-folding manner in which the front surface is disposed inside. When the display device 10 is bent or folded in an in-folding manner, the front surfaces of the display device 10 may be disposed to face each other. In addition, the display device 10 may be folded in an out-folding manner in which the front surface is disposed outside. When the display device 10 is bent or folded in an out-folding manner, the rear surfaces of the display device 10 may be disposed to face each other.

The display device 10 may include a folding area FDA, a first non-folding area NFA1, and a second non-folding area NFA2. The folding area FDA is an area where the display device 10 is folded, and the first non-folding area NFA1 and the second non-folding area NFA2 may be areas where the display device 10 is not folded. The first non-folding area NFA1 may be disposed on one side of the folding area FDA, for example, a lower side thereof. The second non-folding area NFA2 may be disposed on the other side of the folding area FDA, for example, an upper side thereof. For example, the upper side faces the lower side of the folding area FDA.

The touch sensing unit TSU according to an embodiment of the present invention may be formed and disposed on the first non-folding area NFA1 and the second non-folding area NFA2, respectively.

In addition, the folding area FDA may be an area bent with a predetermined curvature in the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

As shown in FIGS. 22 and 23, the first folding line FOL1 and the second folding line FOL2 may be extended in the first direction (X-axis direction), and the display device 10 may be folded in the second direction (Y-axis direction). As a result, since the length of the display device 10 in the second direction (Y-axis direction) may be reduced to half, approximately, the user may conveniently carry the display device 10.

The extended direction of the first folding line FOL1 and the extended direction of the second folding line FOL2 are not limited to the first direction (X-axis direction). For example, the first folding line FOL1 and the second folding line FOL2 may be extended in the second direction (Y-axis direction), and the display device 10 may be folded in the first direction (X-axis direction). In this case, the length of the display device 10 in the first direction (X-axis direction) may be reduced to half, approximately. In addition, the first folding line FOL1 and the second folding line FOL2 may be extended in a diagonal direction of the display device 10 between the first direction (X-axis direction) and the second direction (Y-axis direction). In this case, the display device 10 may be folded in a triangular shape.

When the first folding line FOL1 and the second folding line FOL2 are extended in the first direction (X-axis direction) as shown in FIGS. 22 and 23, the length of the folding area FDA in the second direction (Y-axis direction) may be shorter than that of the folding area FDA in the first direction (X-axis direction). In addition, the length of the first non-folding area NFA1 in the second direction (Y-axis direction) may be longer than that of the folding area FDA in the second direction (Y-axis direction). The length of the second non-folding area NFA2 in the second direction (Y-axis direction) may be longer than that of the folding area FDA in the second direction (Y-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be disposed on the rear surface of the display device 10. The second display area DA2 may overlap the second non-folding area NFA2. Therefore, when the display device 10 is folded, an image may be displayed in the front direction in the second non-folding area NFA2 of the display device 10.

Although FIG. 22 and FIG. 23 illustrate that the through hole TH, in which the camera SDA or the like may be disposed, is disposed in the second non-folding area NFA2, the present invention is not limited thereto. The through hole TH may be disposed in the first non-folding area NFA1 or the folding area FDA.

In the position input device and the position input system including the same according to embodiments of the present invention, position coordinate data of the position input device such as an electronic pen may be generated using position code patterns of a display panel without complicated computation and correction, and position coordinate input of the position input device may be performed. In particular, a position input function based on exact input coordinates may be performed, costs may be reduced, power consumption may be reduced, and a driving process may be simplified.

In addition, in the position input device and the position input system including the same according to embodiments of the present invention, image detection characteristics of position code patterns may be modulated to correspond to an arrangement angle change between the display panel and the position input device, whereby detection accuracy of the position code patterns may be more improved.

While the present invention has been described with reference to the embodiments thereof, it will be understood by those of ordinary skill in the art that various changes in form and detail may be made thereto without departing from the spirit and scope of the present invention.

What is claimed is:

1. A position input device comprising:
   a communication circuit receiving slope angle information of a display panel;
   a code detector detecting a pattern shape image of position code patterns of the display panel by emitting infrared light to the display panel and receiving infrared light reflected from the display panel;
   a light emitting driver controlling an infrared light emitting operation of the code detector;
   a slope detector detecting slope angle information of the position input device; and
   a code processor modulating infrared light emitting characteristics of the code detector or modulating pattern shape image data in response to an arrangement angle information between the display panel and the position input device,
   wherein the code processor computes the slope angle information of the display panel and the slope angle information of the position input device in a preset computation manner to convert or detect the arrangement angle information between the display panel and the position input device, and
   generates a light emission control signal such that at least one of infrared luminous intensity or wavelength band characteristics of the code detector are changed in response to the arrangement angle information between the display panel and the position input device.

2. The position input device of claim 1, wherein the code processor modulates an amplitude and a pulse width of the light emission control signal so that at least one of infrared luminous intensity or wavelength band of the code detector is changed in proportion to or inversely proportional to a change in the arrangement angle information between the display panel and the position input device, and supplies the modulated light emission control signal to the light emitting driver.

3. The position input device of claim 1, wherein the code processor sequentially reads infrared luminous intensity setting values corresponding to a change in the arrangement angle information between the display panel and the position input device, modulates an amplitude and a pulse width of the light emission control signal to change at least one of the infrared luminous intensity or wavelength band characteristics of the code detector in accordance with the read infrared luminous intensity setting values, and supplies the modulated amplitude and pulse width to the light emitting driver.

4. The position input device of claim 1, further comprising a data corrector modulating the pattern shape image data detected from the code detector in response to a change in the arrangement angle information between the display panel and the position input device and supplying the modulated pattern shape image data to the code processor.

5. The position input device of claim 4, wherein the code processor computes the slope angle information of the display panel and the slope angle information of the position input device in a preset computation manner to convert or detect the arrangement angle information between the display panel and the position input device, and
    transmits the arrangement angle information between the display panel and the position input device to the data corrector in real time.

6. The position input device of claim 5, wherein the code processor detects a pattern shape image for the position code patterns from the modulated pattern shape image data modulated and input from the data corrector, and
    extracts and combines data codes corresponding to an arrangement structure and shape of the position code patterns to extract position coordinate data corresponding to the data codes.

7. The position input device of claim 4, wherein the data corrector compares the arrangement angle information between the display panel and the position input device with a plurality of preset angle range information, variably sets a dynamic range of maximum and minimum gray scale values of the pattern shape image to correspond to a range including the arrangement angle information between the display panel and the position input device, modulates the gray scale values of the pattern shape image data so that the gray scale values of the pattern shape image are included within the dynamic range of the maximum and minimum gray scale values, which are variably set, and transmits the modulated gray scale values to the code processor.

8. The position input device of claim 7, wherein the data corrector sets the dynamic range of the maximum and minimum gray scale values of the pattern shape image to be narrower as the arrangement angle information between the display panel and the position input device is vertical or close to vertical, and sets the dynamic range of the maximum and minimum gray scale values of the pattern shape image to be wider as the arrangement angle information between the display panel and the position input device becomes smaller.

9. The position input device of claim 4, wherein the data corrector variably sets a contrast difference or ratio of the pattern shape image to correspond to the change in the arrangement angle information between the display panel and the position input device, and
    modulates the gray scale values of the pattern shape image in accordance with the variably set contrast difference or ratio of the pattern shape image to transmit the modulated gray scale values to the code processor.

10. The position input device of claim 9, wherein the data corrector decreasingly sets a contrast ratio to lower a difference or ratio between the maximum gray scale value and the minimum gray scale value of the pattern shape image as the arrangement angle information between the display panel and the position input device is vertical or close to vertical, and
    increasingly sets the contrast ratio to increase the difference or ratio between the maximum gray scale value and the minimum gray scale value of the pattern shape image as the arrangement angle information between the display panel and the position input device becomes smaller.

11. The position input device of claim 9, wherein the code processor detects a pattern shape image for the position code patterns from the pattern shape image in which the contrast ratio is modulated for each arrangement angle information between the display panel and the position input device, and
    extracts and combines data codes corresponding to the arrangement structure and shape of the position code patterns to extract position coordinate data corresponding to the data codes.

12. A position input system comprising:
a display device displaying an image; and
a position input device inputting position coordinate data to the display device by detecting position code patterns of the display device,
wherein the position input device includes:
a communication circuit receiving slope angle information of a display panel in the display device;
a code detector detecting a pattern shape image of the position code patterns by emitting infrared light to the display panel and receiving infrared light reflected from the display panel;
a light emitting driver controlling an infrared light emitting operation of the code detector;
a slope detector detecting slope angle information of the position input device; and
a code processor modulating infrared light emitting characteristics of the code detector or modulating pattern shape image data in response to an arrangement angle information between the display panel and the position input device; and
a data corrector modulating the pattern shape image data detected from the code detector in response change in the arrangement angle information between the display panel and the position input device and supplying the modulated pattern shape image data to the code processor, wherein the data corrector compares the arrangement angle information between the display panel and the position input device with a plurality of angle range information.

13. The position input system of claim 12, wherein the code processor computes the slope angle information of the display panel and the slope angle information of the position input device in a preset computation manner to convert or detect the arrangement angle information between the display panel and the position input device, and
    transmits the arrangement angle information between the display panel and the position input device to the data corrector in real time.

14. The position input system of claim 13, wherein the code processor detects a pattern shape image for the position code patterns from the modulated pattern shape image data modulated and input from the data corrector, and
    extracts and combines data codes corresponding to an arrangement structure and shape of the position code patterns to extract position coordinate data corresponding to the data codes.

15. The position input system of claim 12, wherein the data corrector variably sets a dynamic range of maximum and minimum gray scale values of the pattern shape image to correspond to a range including the arrangement angle information between the display panel and the position input device, modulates the gray scale values of the pattern shape image data so that the gray scale values of the pattern shape image are included within the dynamic range of the maximum and minimum gray scale values, which are variably set, and transmits the modulated gray scale values to the code processor.

16. The position input system of claim 15, wherein the data corrector sets the dynamic range of the maximum and minimum gray scale values of the pattern shape image to be narrower as the arrangement angle information between the display panel and the position input device is vertical or close to vertical, and sets the dynamic range of the maximum and minimum gray scale values of the pattern shape image to be wider as the arrangement angle information between the display panel and the position input device becomes smaller.

17. The position input system of claim 12, wherein the data corrector variably sets a contrast difference or ratio of the pattern shape image to correspond to the change in the arrangement angle information between the display panel and the position input device, and modulates the gray scale values of the pattern shape image in accordance with the variably set contrast difference or ratio of the pattern shape image to transmit the modulated gray scale values to the code processor.

18. The position input system of claim 17, wherein the data corrector decreasingly sets a contrast ratio to lower a difference or ratio between the maximum gray scale value and the minimum gray scale value of the pattern shape image as the arrangement angle information between the display panel and the position input device is vertical or close to vertical, and increasingly sets the contrast ratio to increase the difference or ratio between the maximum gray scale value and the minimum gray scale value of the pattern shape image as the arrangement angle information between the display panel and the position input device becomes smaller.

* * * * *